(12) United States Patent
Connor et al.

(10) Patent No.: US 11,507,184 B2
(45) Date of Patent: Nov. 22, 2022

(54) GAZE TRACKING APPARATUS AND SYSTEMS

(71) Applicant: Sony Interactive Entertainment Inc., Tokyo (JP)

(72) Inventors: Patrick John Connor, London (GB); Matthew William Sanders, Hertfordshire (GB); Mark Jacobus Breugelmans, London (GB); Maria Chiara Monti, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 17/323,059

(22) Filed: May 18, 2021

(65) Prior Publication Data

US 2021/0373657 A1 Dec. 2, 2021

(30) Foreign Application Priority Data

May 26, 2020 (GB) ...................... 2007791

(51) Int. Cl.
   *G06F 3/01* (2006.01)
   *G06T 3/40* (2006.01)
   *G06T 5/00* (2006.01)

(52) U.S. Cl.
   CPC ............ *G06F 3/013* (2013.01); *G06T 3/4092* (2013.01); *G06T 5/007* (2013.01)

(58) Field of Classification Search
   CPC ....... G06F 3/013; G06T 3/4092; G06T 5/007; G02B 2027/0141; G02B 27/0093; G02B 27/017
   See application file for complete search history.

(56) References Cited

U.S. PATENT DOCUMENTS

| | | | |
|---|---|---|---|
| 2018/0136722 A1 | 5/2018 | Mallinson | |
| 2019/0204910 A1 | 7/2019 | Held | |
| 2019/0339770 A1* | 11/2019 | Kurlethimar | ......... G06F 3/0346 |
| 2019/0346922 A1 | 11/2019 | Young | |
| 2019/0354173 A1 | 11/2019 | Young | |
| 2020/0019238 A1 | 1/2020 | Agaoglu | |

OTHER PUBLICATIONS

Extended European Examination Report for corresponding application No. 21173410.8, 8 pages, dated Jun. 7, 2021.
Combined Search and Examination Report for corresponding application No. GB2007791.3, 9 pages, dated Feb. 18, 2021.

* cited by examiner

*Primary Examiner* — Chong Wu
(74) *Attorney, Agent, or Firm* — Matthew B. Dernier, Esq.

(57) ABSTRACT

A head-mountable display (HMD) system includes at least one detector to detect movement of an eye of a user wearing the HMD, control circuitry to detect saccadic movement of the eye in dependence upon the detected movement of the eye, a display unit and a processor to generate images for display to the user by the display unit, in which the control circuitry is configured to control the processor in response to the detected saccadic movement, in which the control circuitry is configured to control the processor to adjust one or more image quality parameters for one or more of the images to be displayed by the display unit during the detected saccadic movement.

13 Claims, 11 Drawing Sheets detected saccade detected saccade

GAZE TRACKING APPARATUS AND SYSTEMS

BACKGROUND OF THE INVENTION

Field of the Invention

This invention relates to gaze tracking apparatus and systems.

Description of the Prior Art

Gaze tracking systems are used to identify a location of a subject's gaze within an environment; in many cases, this location may be a position on a display screen that is being viewed by the subject. In a number of existing arrangements, this is performed using one or more inwards-facing cameras directed towards the subject's eye (or eyes) in order to determine a direction in which the eyes are oriented at any given time. Having identified the orientation of the eye, a gaze direction can be determined and a focal region may be determined as the intersection of the gaze direction of each eye.

One application for which gaze tracking is considered of particular use is that of use in head-mountable display units (HMDs). The use in HMDs may be of particular benefit owing to the close proximity of inward-facing cameras to the user's eyes, allowing the tracking to be performed much more accurately and precisely than in arrangements in which it is not possibly to provide the cameras with such proximity.

By utilising gaze detection techniques, it may be possible to provide a more efficient and/or effective processing method for generating content or interacting with devices.

For example, gaze tracking may be used to provide user inputs or to assist with such inputs—a continued gaze at a location may act as a selection, or a gaze towards a particular object accompanied by another input (such as a button press) may be considered as a suitable input. This may be more effective as an input method in some embodiments, particularly in those in which a controller is not provided or when a user has limited mobility.

Foveal rendering is an example of a use for the results of a gaze tracking process in order to improve the efficiency of a content generation process. Foveal rendering is rendering that is performed so as to exploit the fact that human vision is only able to identify high detail in a narrow region (the fovea), with the ability to discern detail tailing off sharply outside of this region.

In such methods, a portion of the display is identified as being an area of focus in accordance with the user's gaze direction. This portion of the display is supplied with high-quality image content, while the remaining areas of the display are provided with lower-quality (and therefore less resource intensive to generate) image content. This can lead to a more efficient use of available processing resources without a noticeable degradation of image quality for the user.

It is therefore considered advantageous to be able to improve gaze tracking methods, and/or apply the results of such methods in an improved manner. It is in the context of such advantages that the present disclosure arises.

SUMMARY OF THE INVENTION

Various aspects and features of the present invention are defined in the appended claims and within the text of the accompanying description.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
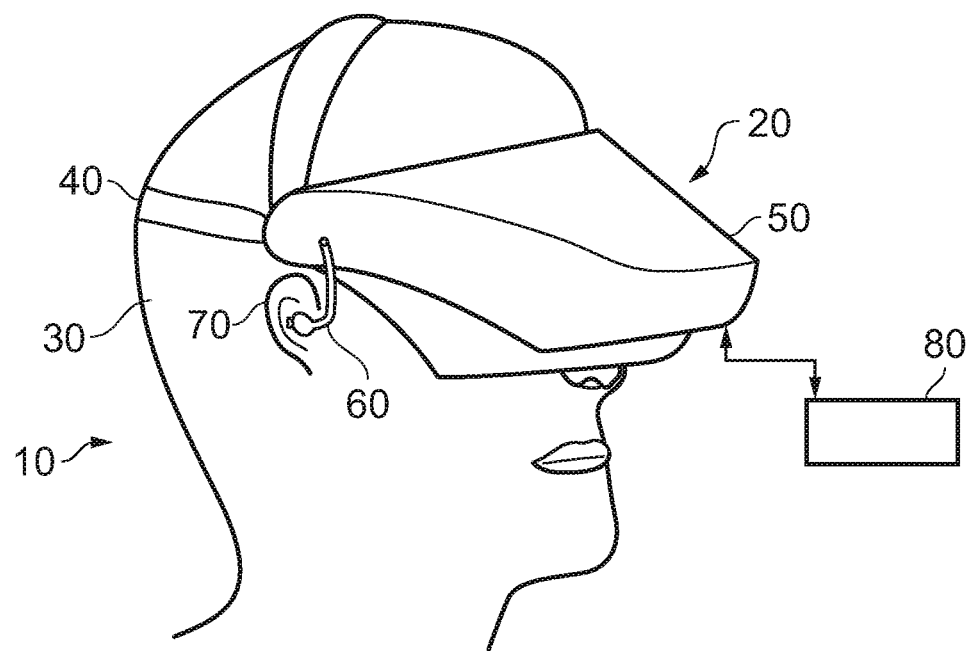
FIG. 1 schematically illustrates an HMD worn by a user.

Referring now to the drawings, wherein like reference numerals designate identical or corresponding parts throughout the several views, in FIG. 1 a user 10 is wearing an HMD 20 (as an example of a generic head-mountable apparatus—other examples including audio headphones or a head-mountable light source) on the user's head 30. The HMD comprises a frame 40, in this example formed of a rear strap and a top strap, and a display portion 50. As noted above, many gaze tracking arrangements may be considered particularly suitable for use in HMD systems; however, use with such an HMD system should not be considered essential.

Note that the HMD of FIG. 1 may comprise further features, to be described below in connection with other drawings, but which are not shown in FIG. 1 for clarity of this initial explanation.

The HMD of FIG. 1 completely (or at least substantially completely) obscures the user's view of the surrounding environment. All that the user can see is the pair of images displayed within the HMD, as supplied by an external processing device such as a games console in many embodiments. Of course, in some embodiments images may instead (or additionally) be generated by a processor or obtained from memory located at the HMD itself.

The HMD has associated headphone audio transducers or earpieces 60 which fit into the user's left and right ears 70. The earpieces 60 replay an audio signal provided from an external source, which may be the same as the video signal source which provides the video signal for display to the user's eyes.

The combination of the fact that the user can see only what is displayed by the HMD and, subject to the limitations of the noise blocking or active cancellation properties of the earpieces and associated electronics, can hear only what is provided via the earpieces, mean that this HMD may be considered as a so-called "full immersion" HMD. Note however that in some embodiments the HMD is not a full immersion HMD, and may provide at least some facility for the user to see and/or hear the user's surroundings. This could be by providing some degree of transparency or partial transparency in the display arrangements, and/or by projecting a view of the outside (captured using a camera, for example a camera mounted on the HMD) via the HMD's displays, and/or by allowing the transmission of ambient sound past the earpieces and/or by providing a microphone to generate an input sound signal (for transmission to the earpieces) dependent upon the ambient sound.

A front-facing camera 122 may capture images to the front of the HMD, in use. Such images may be used for head tracking purposes, in some embodiments, while it may also be suitable for capturing images for an augmented reality (AR) style experience. A Bluetooth® antenna 124 may provide communication facilities or may simply be arranged as a directional antenna to allow a detection of the direction of a nearby Bluetooth® transmitter.

In operation, a video signal is provided for display by the HMD. This could be provided by an external video signal source 80 such as a video games machine or data processing apparatus (such as a personal computer), in which case the signals could be transmitted to the HMD by a wired or a wireless connection. Examples of suitable wireless connections include Bluetooth® connections. Audio signals for the earpieces 60 can be carried by the same connection. Similarly, any control signals passed from the HMD to the video (audio) signal source may be carried by the same connection. Furthermore, a power supply 83 (including one or more batteries and/or being connectable to a mains power outlet) may be linked by a cable to the HMD. Note that the power supply 83 and the video signal source 80 may be separate units or may be embodied as the same physical unit. There may be separate cables for power and video (and indeed for audio) signal supply, or these may be combined for carriage on a single cable (for example, using separate conductors, as in a USB cable, or in a similar way to a "power over Ethernet" arrangement in which data is carried as a balanced signal and power as direct current, over the same collection of physical wires). The video and/or audio signal may be carried by, for example, an optical fibre cable. In other embodiments, at least part of the functionality associated with generating image and/or audio signals for presentation to the user may be carried out by circuitry and/or processing forming part of the HMD itself. A power supply may be provided as part of the HMD itself.

Some embodiments of the invention are applicable to an HMD having at least one electrical and/or optical cable linking the HMD to another device, such as a power supply and/or a video (and/or audio) signal source. So, embodiments of the invention can include, for example:

(a) an HMD having its own power supply (as part of the HMD arrangement) but a cabled connection to a video and/or audio signal source;
(b) an HMD having a cabled connection to a power supply and to a video and/or audio signal source, embodied as a single physical cable or more than one physical cable;
(c) an HMD having its own video and/or audio signal source (as part of the HMD arrangement) and a cabled connection to a power supply; or
(d) an HMD having a wireless connection to a video and/or audio signal source and a cabled connection to a power supply.

If one or more cables are used, the physical position at which the cableenters or joins the HMD is not particularly important from a technical point of view. Aesthetically, and to avoid the cable(s) brushing the user's face in operation, it would normally be the case that the cable(s) would enter or join the HMD at the side or back of the HMD (relative to the orientation of the user's head when worn in normal operation). Accordingly, the position of the cables relative to the HMD in FIG. 1 should be treated merely as a schematic representation.

Accordingly, the arrangement of FIG. 1 provides an example of a head-mountable display system comprising a frame to be mounted onto an observer's head, the frame defining one or two eye display positions which, in use, are positioned in front of a respective eye of the observer and a display element (display unit) mounted with respect to each of the eye display positions, the display element providing a virtual image of a video display of a video signal from a video signal source to that eye of the observer.

FIG. 1 shows just one example of an HMD. Other formats are possible: for example an HMD could use a frame more similar to that associated with conventional eyeglasses, namely a substantially horizontal leg extending back from the display portion to the top rear of the user's ear, possibly curling down behind the ear. In other (not full immersion) examples, the user's view of the external environment may not in fact be entirely obscured; the displayed images could be arranged so as to be superposed (from the user's point of view) over the external environment. An example of such an arrangement will be described below with reference to FIG. 4.

Figure 2:
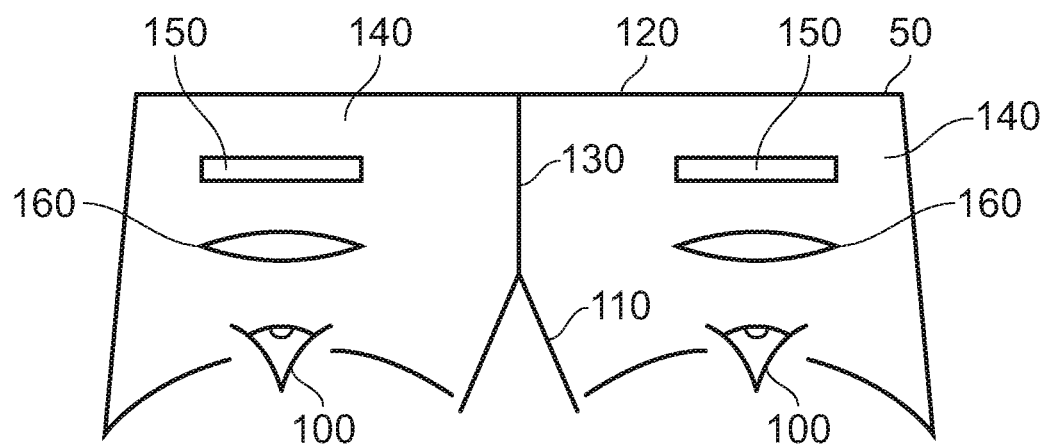
FIG. 2 is a schematic plan view of an HMD.

In the example of FIG. 1, a separate respective display is provided for each of the user's eyes. A schematic plan view of how this is achieved is provided as FIG. 2, which illustrates the positions 100 of the user's eyes and the relative position 110 of the user's nose. The display portion 50, in schematic form, comprises an exterior shield 120 to mask ambient light from the user's eyes and an internal shield 130 which prevents one eye from seeing the display intended for the other eye. The combination of the user's face, the exterior shield 120 and the interior shield 130 form two compartments 140, one for each eye. In each of the compartments there is provided a display element (display unit) 150 and one or more optical elements 160. The way in which the display element and the optical element(s) cooperate to provide a display to the user will be described with reference to FIG. 3.

Figure 3:
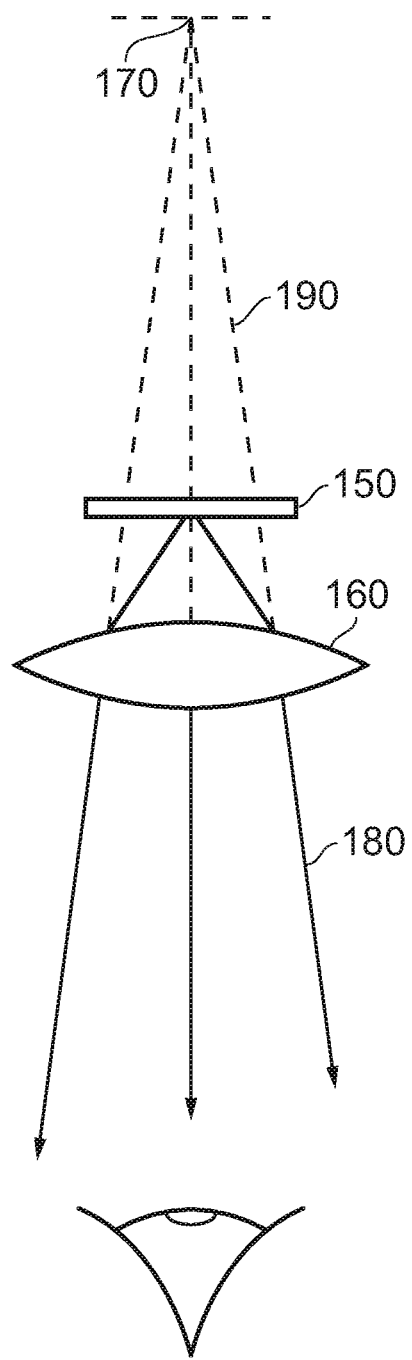
FIG. 3 schematically illustrates the formation of a virtual image by an HMD.

Referring to FIG. 3, the display element (display unit) 150 generates a displayed image which is (in this example) refracted by the optical elements 160 (shown schematically as a convex lens but which could include compound lenses or other elements) so as to generate a virtual image 170 which appears to the user to be larger than and significantly further away than the real image generated by the display element 150. As an example, the virtual image may have an apparent image size (image diagonal) of more than 1 m and may be disposed at a distance of more than 1 m from the user's eye (or from the frame of the HMD). In general terms, depending on the purpose of the HMD, it is desirable to have the virtual image disposed a significant distance from the user. For example, if the HMD is for viewing movies or the like, it is desirable that the user's eyes are relaxed during such viewing, which requires a distance (to the virtual image) of at least several metres. In FIG. 3, solid lines (such as the line 180) are used to denote real optical rays, whereas broken lines (such as the line 190) are used to denote virtual rays.

Figure 4:
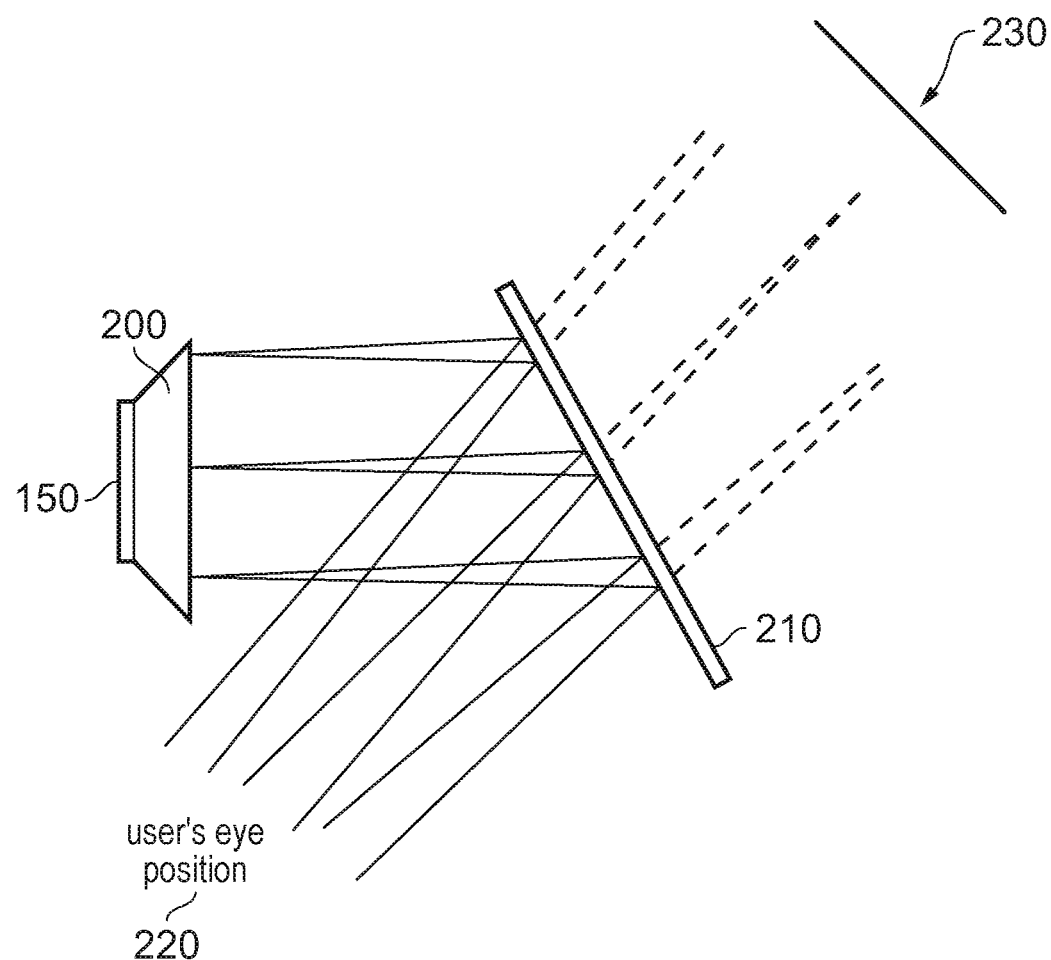
FIG. 4 schematically illustrates another type of display for use in an HMD.

An alternative arrangement is shown in FIG. 4. This arrangement may be used where it is desired that the user's view of the external environment is not entirely obscured. However, it is also applicable to HMDs in which the user's external view is wholly obscured. In the arrangement of FIG. 4, the display element (display unit) 150 and optical elements 200 cooperate to provide an image which is projected onto a mirror 210, which deflects the image towards the user's eye position 220. The user perceives a virtual image to be located at a position 230 which is in front of the user and at a suitable distance from the user.

In the case of an HMD in which the user's view of the external surroundings is entirely obscured, the mirror 210 can be a substantially 100% reflective mirror. The arrangement of FIG. 4 then has the advantage that the display element and optical elements can be located closer to the centre of gravity of the user's head and to the side of the user's eyes, which can produce a less bulky HMD for the user to wear. Alternatively, if the HMD is designed not to completely obscure the user's view of the external environment, the mirror 210 can be made partially reflective so that the user sees the external environment, through the mirror 210, with the virtual image superposed over the real external environment.

Figure 5:
FIG. 5 schematically illustrates a pair of stereoscopic images.

In the case where separate respective displays are provided for each of the user's eyes, it is possible to display stereoscopic images. An example of a pair of stereoscopic images for display to the left and right eyes is shown in FIG. 5. The images exhibit a lateral displacement relative to one another, with the displacement of image features depending upon the (real or simulated) lateral separation of the cameras by which the images were captured, the angular convergence of the cameras and the (real or simulated) distance of each image feature from the camera position.

Note that the lateral displacements in FIG. 5 could in fact be the other way round, which is to say that the left eye image as drawn could in fact be the right eye image, and the right eye image as drawn could in fact be the left eye image. This is because some stereoscopic displays tend to shift objects to the right in the right eye image and to the left in the left eye image, so as to simulate the idea that the user is looking through a stereoscopic window onto the scene beyond. However, some HMDs use the arrangement shown in FIG. 5 because this gives the impression to the user that the user is viewing the scene through a pair of binoculars. The choice between these two arrangements is at the discretion of the system designer.

In some situations, an HMD may be used simply to view movies and the like. In this case, there is no change required to the apparent viewpoint of the displayed images as the user turns the user's head, for example from side to side. In other uses, however, such as those associated with virtual reality (VR) or augmented reality (AR) systems, the user's viewpoint needs to track movements with respect to a real or virtual space in which the user is located.

As mentioned above, in some uses of the HMD, such as those associated with virtual reality (VR) or augmented reality (AR) systems, the user's viewpoint needs to track movements with respect to a real or virtual space in which the user is located.

This tracking is carried out by detecting motion of the HMD and varying the apparent viewpoint of the displayed images so that the apparent viewpoint tracks the motion. The detection may be performed using any suitable arrangement (or a combination of such arrangements). Examples include the use of hardware motion detectors (such as accelerometers or gyroscopes), external cameras operable to image the HMD, and outwards-facing cameras mounted onto the HMD.

Turning to gaze tracking in such an arrangement, FIG. 6 schematically illustrates two possible arrangements for performing eye tracking on an HMD. The cameras provided within such arrangements may be selected freely so as to be able to perform an effective eye-tracking method. In some existing arrangements, visible light cameras are used to capture images of a user's eyes. Alternatively, infra-red (IR) cameras are used so as to reduce interference either in the captured signals or with the user's vision should a corresponding light source be provided, or to improve performance in low-light conditions.

Figure 6A:
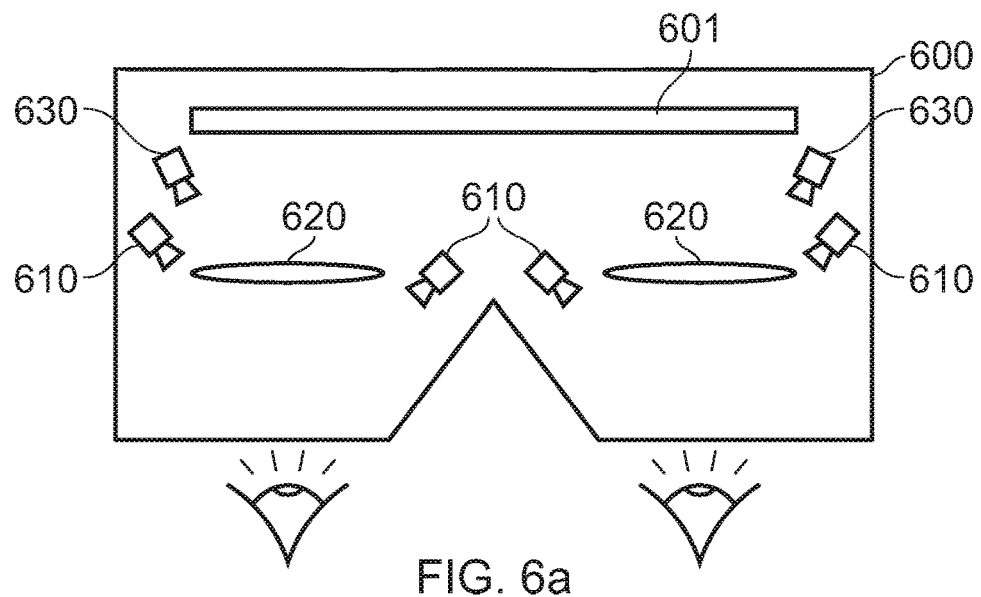
FIG. 6a schematically illustrates a plan view of an HMD.

FIG. 6a shows an example of a gaze tracking arrangement in which the cameras are arranged within an HMD so as to capture images of the user's eyes from a short distance. This may be referred to as near-eye tracking, or head-mounted tracking.

In this example, an HMD 600 with a display element (display unit) 601 is provided with cameras 610 that are each arranged so as to directly capture one or more images of a respective one of the user's eyes using an optical path that does not include the lens 620. This may be advantageous in that distortion in the captured image due to the optical effect of the lens is able to be avoided. Four cameras 610 are shown here as examples of possible positions that eye-tracking cameras may provided, although it should be considered that any number of cameras may be provided in any suitable location so as to be able to image the corresponding eye effectively. For example, only one camera may be provided per eye or more than two cameras may be provided for each eye.

However it is considered that in a number of embodiments it is advantageous that the cameras are instead arranged so as to include the lens 620 in the optical path used to capture images of the eye. Examples of such positions are shown by the cameras 630. While this may result in processing being required to enable suitably accurate tracking to be performed, due to the deformation in the captured image due to the lens, this may be performed relatively simply due to the fixed relative positions of the corresponding cameras and lenses. An advantage of including the lens within the optical path may be that of simplifying the physical constraints upon the design of an HMD, for example.

Figure 6B:
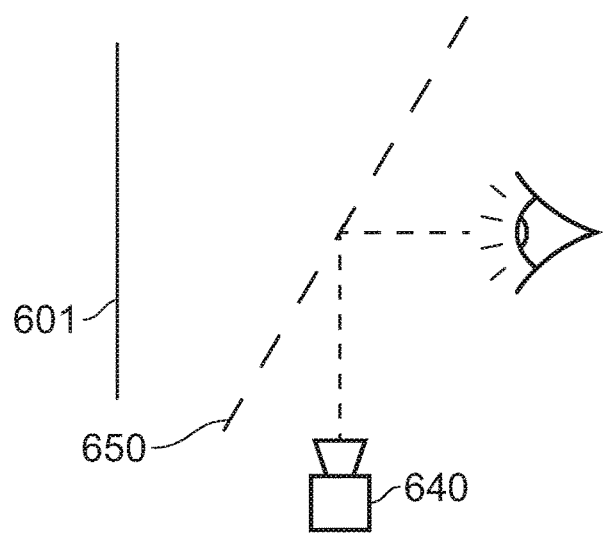
FIG. 6b schematically illustrates a near-eye tracking arrangement.

FIG. 6b shows an example of a gaze tracking arrangement in which the cameras are instead arranged so as to indirectly capture images of the user's eyes. Such an arrangement may be particularly suited to use with IR or otherwise non-visible light sources, as will be apparent from the below description.

FIG. 6b includes a mirror 650 arranged between a display 601 and the viewer's eye (of course, this can be extended to or duplicated at the user's other eye as appropriate). For the sake of clarity, any additional optics (such as lenses) are omitted in this Figure—it should be appreciated that they may be present at any suitable position within the depicted arrangement. The mirror 650 in such an arrangement is selected so as to be partially transmissive; that is, the mirror 650 should be selected so as to enable the camera 640 to obtain an image of the user's eye while the user views the display 601. One method of achieving this is to provide a mirror 650 that is reflective to IR wavelengths but transmissive to visible light—this enables IR light used for tracking to be reflected from the user's eye towards the camera 640 while the light emitted by the display 601 passes through the mirror uninterrupted.

Figure 7:
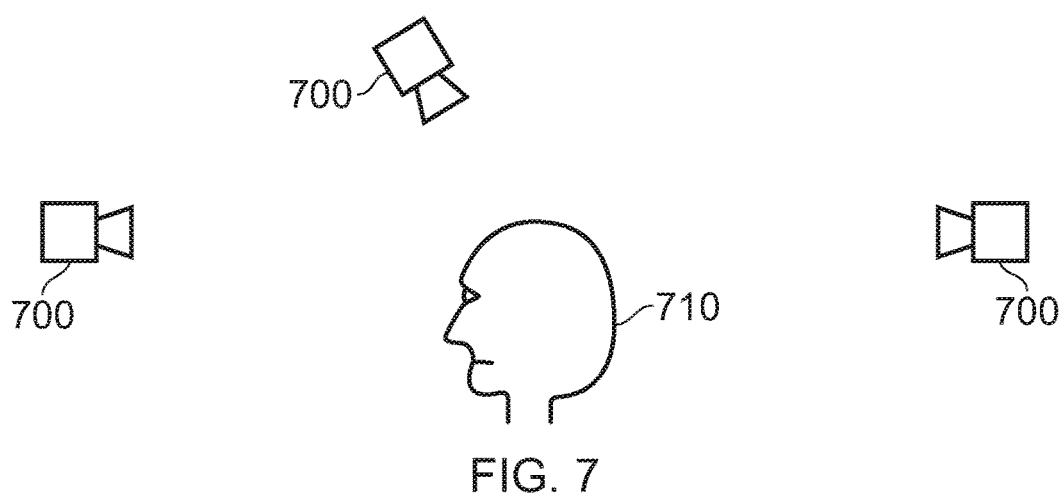
FIG. 7 schematically illustrates a remote tracking arrangement.

Such an arrangement may be advantageous in that the cameras may be more easily arranged out of view of the user, for instance. Further to this, improvements to the accuracy of the eye tracking may be obtained due to the fact that the camera captures images from a position that is effectively (due to the reflection) along the axis between the user's eye and the display. Of course, eye-tracking arrangements need not be implemented in a head-mounted or otherwise near-eye fashion as has been described above. For example, FIG. 7 schematically illustrates a system in which a camera is arranged to capture images of the user from a distance; this distance may vary during tracking, and may take any value in dependence upon the parameters of the tracking system. For example, this distance may be thirty centimetres, a metre, five metres, ten metres, or indeed any value so long as the tracking is not performed using an arrangement that is affixed to the user's head.

In FIG. 7, an array of cameras 700 is provided that together provide multiple views of the user 710. These cameras are configured to capture information identifying at least the direction in which a user's 710 eyes are focused, using any suitable method. For example, IR cameras may be utilised to identify reflections from the user's 710 eyes. An array of cameras 700 may be provided so as to provide multiple views of the user's 710 eyes at any given time, or may be provided so as to simply ensure that at any given time at least one camera 700 is able to view the user's 710 eyes. It is apparent that in some use cases it may not be necessary to provide such a high level of coverage and instead only one or two cameras 700 may be used to cover a smaller range of possible viewing directions of the user 710.

Of course, the technical difficulties associated with such a long-distance tracking method may be increased; higher resolution cameras may be required, as may stronger light sources for generating IR light, and further information (such as head orientation of the user) may need to be input to determine a focus of the user's gaze. The specifics of the arrangement may be determined in dependence upon a required level of robustness, accuracy, size, and/or cost, for example, or any other design consideration.

Despite technical challenges including those discussed above, such tracking methods may be considered beneficial in that they allow a greater range of interactions for a user—rather than being limited to HMD viewing, gaze tracking may be performed for a viewer of a television, for instance.

Rather than varying only in the location in which cameras are provided, eye-tracking arrangements may also differ in where the processing of the captured image data to determine tracking data is performed.

Figure 8:
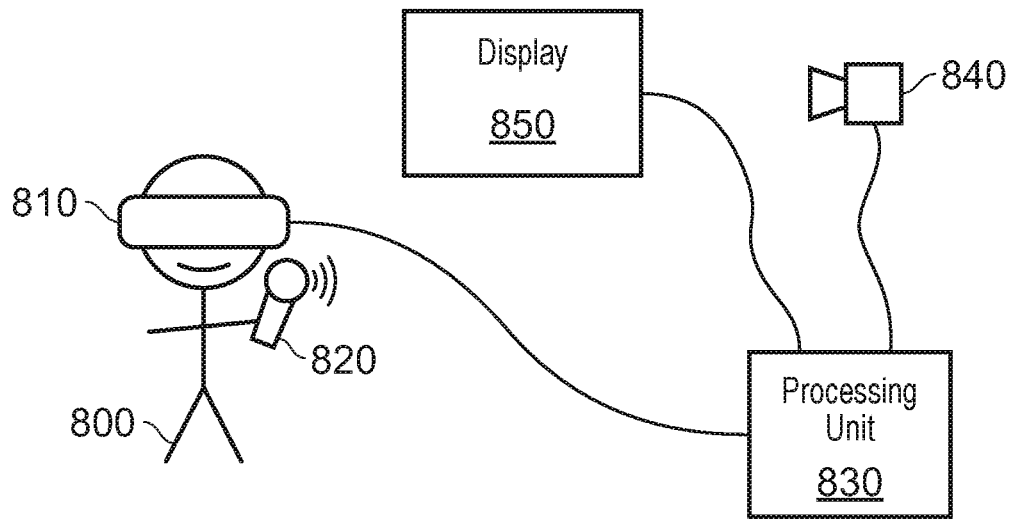
FIG. 8 schematically illustrates a gaze tracking environment.

FIG. 8 schematically illustrates an environment in which an eye-tracking process may be performed. In this example, the user 800 is using an HMD 810 that is associated with the processing unit 830, such as a games console, with the peripheral 820 allowing a user 800 to input commands to control the processing. The HMD 810 may perform eye tracking in line with an arrangement exemplified by FIG. 6a or 6b, for example—that is, the HMD 810 may comprise one or more cameras operable to capture images of either or both of the user's 800 eyes. The processing unit 830 may be operable to generate content for display at the HMD 810; although some (or all) of the content generation may be performed by processing units within the HMD 810.

The arrangement in FIG. 8 also comprises a camera 840, located outside of the HMD 810, and a display 850. In some cases, the camera 840 may be used for performing tracking of the user 800 while using the HMD 810, for example to identify body motion or a head orientation. The camera 840 and display 850 may be provided as well as or instead of the HMD 810; for example these may be used to capture images of a second user and to display images to that user while the first user 800 uses the HMD 810, or the first user 800 may be tracked and view content with these elements instead of the HMD 810. That is to say, the display 850 may be operable to display generated content provided by the processing unit 830 and the camera 840 may be operable to capture images of one or more users' eyes to enable eye-tracking to be performed.

While the connections shown in FIG. 8 are shown by lines, this should of course not be taken to mean that the connections should be wired; any suitable connection method, including wireless connections such as wireless networks or Bluetooth®, may be considered suitable. Similarly, while a dedicated processing unit 830 is shown in FIG. 8 it is also considered that the processing may in some embodiments be performed in a distributed manner—such as using a combination of two or more of the HMD 810, one or more processing units, remote servers (cloud processing), or games consoles.

Figure 9:
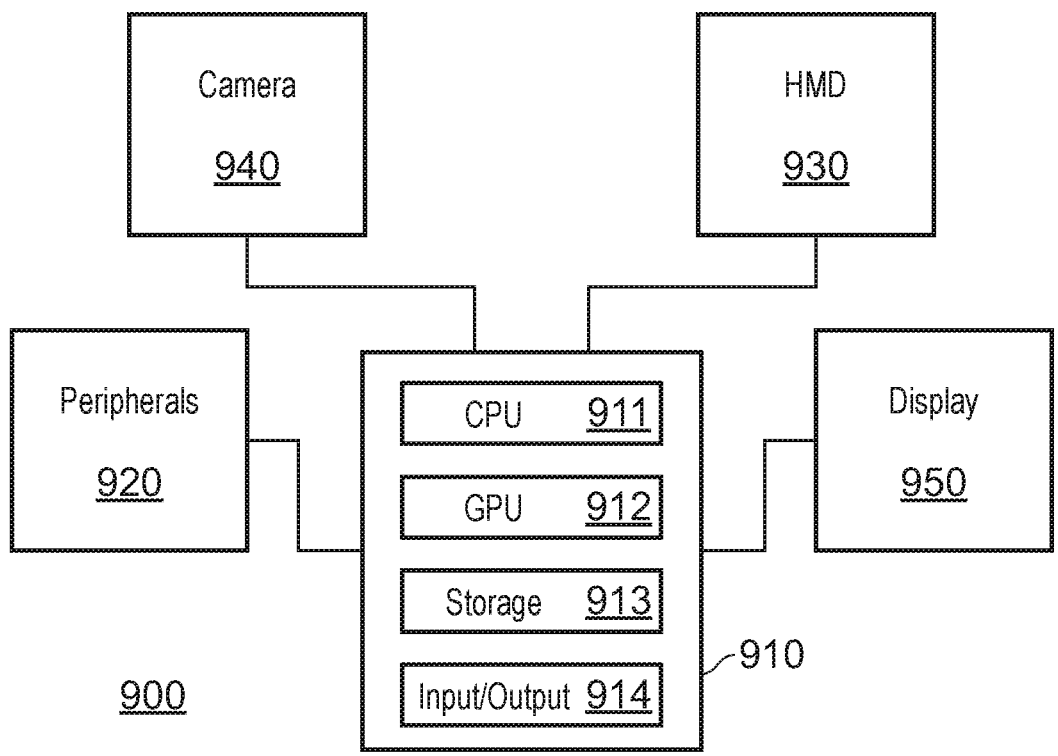
FIG. 9 schematically illustrates a gaze tracking system.

The processing required to generate tracking information from captured images of the user's 800 eye or eyes may be performed locally by the HMD 810, or the captured images or results of one or more detections may be transmitted to an external device (such as a the processing unit 830) for processing. In the former case, the HMD 810 may output the results of the processing to an external device for use in an image generation process if such processing is not performed exclusively at the HMD 810. In embodiments in which the HMD 810 is not present, captured images from the camera 840 are output to the processing unit 830 for processing. FIG. 9 schematically illustrates a system for performing one or more eye tracking processes, for example in an embodiment such as that discussed above with reference to FIG. 8. The system 900 comprises a processing device 910, one or more peripherals 920, an HMD 930, a camera 940, and a display 950. Of course, not all elements need be present within the system 900 in a number of embodiments—for instance, if the HMD 930 is present then it is considered that the camera 940 may be omitted as it is unlikely to be able to capture images of the user's eyes.

As shown in FIG. 9, the processing device 910 may comprise one or more of a central processing unit (CPU) 911, a graphics processing unit (GPU) 912, storage (such as a hard drive, or any other suitable data storage medium) 913, and an input/output 914. These units may be provided in the form of a personal computer, a games console, or any other suitable processing device.

For example, the CPU 911 may be configured to generate tracking data from one or more input images of the user's eyes from one or more cameras, or from data that is indicative of a user's eye direction. This may be data that is obtained from processing images of the user's eye at a remote device, for example. Of course, should the tracking data be generated elsewhere then such processing would not be necessary at the processing device 910.

The GPU 912 may be configured to generate content for display to the user on which the eye tracking is being performed. In some embodiments, the content itself may be modified in dependence upon the tracking data that is obtained—an example of this is the generation of content in accordance with a foveal rendering technique. Of course, such content generation processes may be performed elsewhere—for example, an HMD 930 may have an on-board GPU that is operable to generate content in dependence upon the eye tracking data.

The storage 913 may be provided so as to store any suitable information. Examples of such information include program data, content generation data, and eye tracking model data. In some cases, such information may be stored remotely such as on a server, and as such a local storage 913 may not be required—the discussion of the storage 913 should therefore be considered to refer to local (and in some cases removable storage media) or remote storage.

The input/output 914 may be configured to perform any suitable communication as appropriate for the processing device 910. Examples of such communication include the transmission of content to the HMD 930 and/or display 950, the reception of eye-tracking data and/or images from the HMD 930 and/or the camera 940, and communication with one or more remote servers (for example, via the internet).

As discussed above, the peripherals 920 may be provided to allow a user to provide inputs to the processing device 910 in order to control processing or otherwise interact with generated content. This may be in the form of button presses or the like, or alternatively via tracked motion to enable gestures to be used as inputs.

The HMD 930 may comprise a number of sub-elements, which have been omitted from FIG. 9 for the sake of clarity. Of course, the HMD 930 should comprise a display unit operable to display images to a user. In addition to this, the HMD 930 may comprise any number of suitable cameras for eye tracking (as discussed above), in addition to one or more processing units that are operable to generate content for display and/or generate eye tracking data from the captured images.

The camera 940 and display 950 may be configured in accordance with the discussion of the corresponding elements above with respect to FIG. 8.

Turning to the image capture process upon which the eye tracking is based, examples of different cameras are discussed. The first of these is a standard camera, which captures a sequence of images of the eye that may be processed to determine tracking information. The second is that of an event camera, which instead generates outputs in accordance with observed changes in brightness.

It is more common to use standard cameras in such tracking arrangements, given that they are widely available and often relatively cheap to produce. 'Standard cameras' here refer to cameras which capture images of the environment at predetermined intervals which can be combined to generate video content. For example, a typical camera of this type may capture thirty images (frames) each second, and these images may be output to a processing unit for feature detection or the like to be performed so as to enable tracking of the eye.

Such a camera comprises a light-sensitive array that is operable to record light information during an exposure time, with the exposure time being controlled by a shutter speed (the speed of which dictates the frequency of image capture). The shutter may be configured as a rolling shutter (line-by-line reading of the captured information) or a global shutter (reading the captured information of the whole frame simultaneously), for example.

However, in some arrangements it may be considered advantageous to instead use an event camera, which may also be referred to as a dynamic vision sensor. Such cameras do not require a shutter as described above, and instead each element of the light-sensitive array (often referred to as a pixel) is configured to output a signal at any time a threshold brightness change is observed. This means that images are not output in the traditional sense—however an image reconstruction algorithm may be applied that is able to generate an image from the signals output by an event camera.

While there is an increased computational complexity for generating an image from such data, the output of the event camera can be used for tracking without any image generation. One example of how this is performed is that of using an IR-sensitive event camera; when imaged using IR light, the pupil of the human eye displays a much higher level of brightness than the surrounding features. By selecting an appropriate threshold brightness, the motion of the pupil would be expected to trigger events (and corresponding outputs) at the sensor.

Independent of the type of camera that is selected, in many cases it may be advantageous to provide illumination to the eye in order to obtain a suitable image. One example of this is the provision of an IR light source that is configured to emit light in the direction of one or both of the user's eyes; an IR camera may then be provided that is able to detect reflections from the user's eye in order to generate an image. IR light may be preferable as it is invisible to the human eye, and as such does not interfere with normal viewing of content by the user, but it is not considered to be essential. In some cases, the illumination may be provided by a light source that is affixed to the imaging device, while in other embodiments it may instead be that the light source is arranged away from the imaging device.

Figure 10:
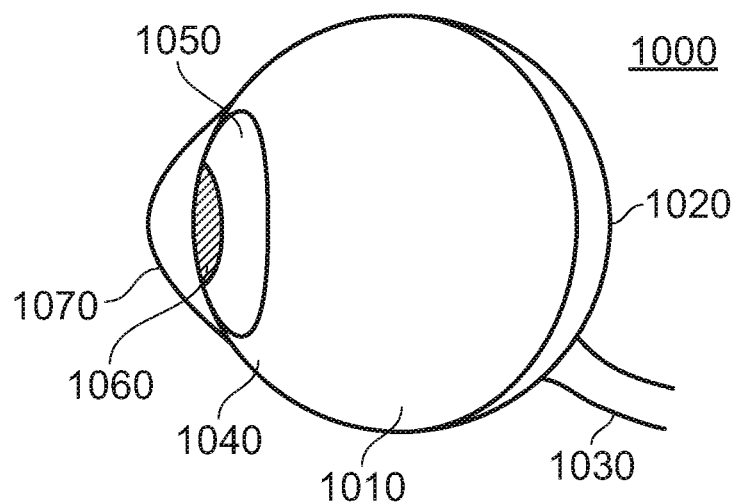
FIG. 10 schematically illustrates a human eye.

As suggested in the discussion above, the human eye does not have a uniform structure; that is, the eye is not a perfect sphere, and different parts of the eye have different characteristics (such as varying reflectance or colour). FIG. 10 shows a simplified side view of the structure of a typical eye 1000; this Figure has omitted features such as the muscles which control eye motion for the sake of clarity.

The eye 1000 is formed of a near-spherical structure filled with an aqueous solution 1010, with a retina 1020 formed on the rear surface of the eye 1000. The optic nerve 1030 is connected at the rear of the eye 1000. Images are formed on the retina 1020 by light entering the eye 1000, and corresponding signals carrying visual information are transmitted from the retina 1020 to the brain via the optic nerve 1030.

Turning to the front surface of the eye 1000, the sclera 1040 (commonly referred to as the white of the eye) surrounds the iris 1050. The iris 1050 controls the size of the pupil 1060, which is an aperture through which light enters the eye 1000. The iris 1050 and pupil 1060 are covered by the cornea 1070, which is a transparent layer which can refract light entering the eye 1000. The eye 1000 also comprises a lens (not shown) that is present behind the iris 1050 that may be controlled to adjust the focus of the light entering the eye 1000.

Figure 11:
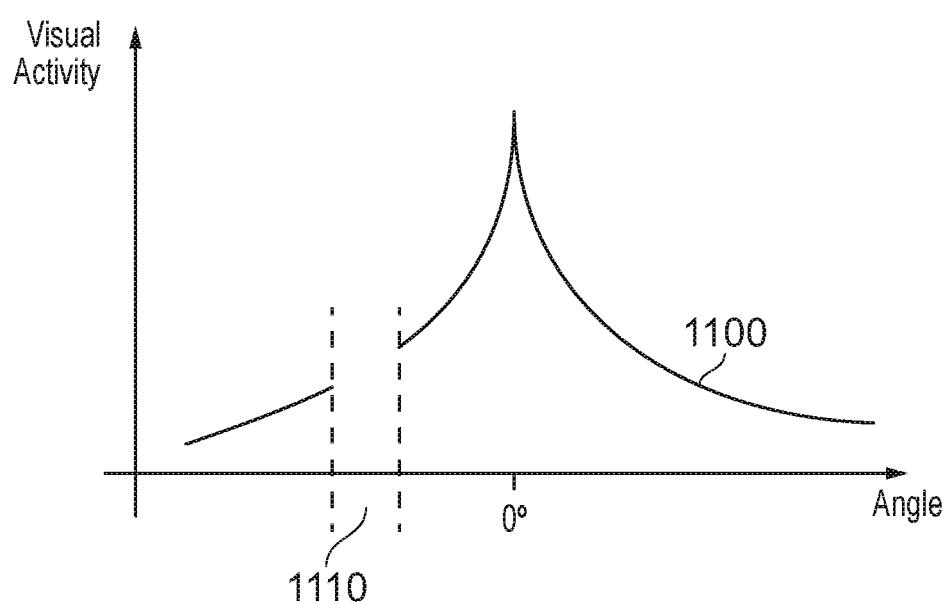
FIG. 11 schematically illustrates a graph of human visual acuity.

The structure of the eye is such that there is an area of high visual acuity (the fovea), with a sharp drop off either side of this. This is illustrated by the curve 1100 of FIG. 11, with the peak in the centre representing the foveal region. The area 1110 is the 'blind spot'; this is an area in which the eye has no visual acuity as it corresponds to the area where the optic nerve meets the retina. The periphery (that is, the viewing angles furthest from the fovea) is not particularly sensitive colour or detail, and instead is used to detect motion.

As has been discussed above, foveal rendering is a rendering technique that takes advantage of the relatively small size (around 2.5 degrees) of the fovea and the sharp fall-off in acuity outside of that.

The eye undergoes a large amount of motion during viewing, and this motion may be categorised into one of a number of categories.

A saccadic eye movement is identified as a fast motion of the eye in which the eye moves in a ballistic manner to change a point of fixation. A saccadic eye movement may be considered as being a ballistic movement, in that once the movement of the eye has been initiated to change a point of focus from a current point of focus to a target point of focus (next point of focus), the target point of focus and the direction of movement of the eye to move the point of focus to the target point of focus cannot be altered by the human visual system. Therefore at the time of initiation of the saccadic eye movement, the eye movements to be performed have already been determined and are thus said to be predetermined. During the course of the eye movement to change from the current fixation point to the next fixation point it is not possible to interrupt the eye movement, and upon reaching the target fixation point the eye remains stationary for a period of time (a fixation pause) to focus on the target fixation point before subsequent eye movement can be initiated.

It is sometimes observed that a saccade is followed by a smaller corrective saccade that is performed to bring the eye closer to the target fixation point. Such a corrective saccade typically occurs after a short period of time. As such, saccades can range in size from a small eye movement such as a corrective saccade or a small eye movement made while reading text, for example, to a much larger eye movement made when observing a surrounding environment.

Saccades performed when reading text are voluntarily initiated by the human visual system, whereas when surveying a surrounding environment or viewing an image on a display unit saccades are often performed reflexively to focus on a target. Saccades may have a duration of up to approximately two hundred milliseconds, depending on a size of the angle rotated by the eye to change the position of the foveal region of the viewer's vision, but may have a duration as short as twenty milliseconds. Typical rotational velocities for a saccadic eye movement may range from fifty up to seven hundred degrees per second. The rotational velocity of the eye during a saccadic eye movement and the magnitude of the total rotation angle have a relationship in that larger rotational velocities are observed for larger rotation angles. 'Smooth pursuit' refers to a slower movement type than a saccade. Smooth pursuit is generally associated with a conscious tracking of a point of focus by a viewer, and is performed so as to maintain the position of a target within (or at least substantially within) the foveal region of the viewer's vision. This enables a high-quality view of a target of interest to be maintained in spite of motion. If the target moves too fast, then smooth pursuit may instead require a number of saccades in order to keep up; this is because smooth pursuit has a lower maximum speed, in the region of thirty degrees per second.

The vestibular-ocular reflex is a further example of eye motion. The vestibular-ocular reflex is the motion of the eyes that counteracts head motion; that is, the motion of the eyes relative to the head that enables a person to remain focused on a particular point despite moving their head.

Another type of motion is that of the vergence accommodation reflex. This is the motion that causes the eyes to rotate to converge at a point, and the corresponding adjustment of the lens within the eye to cause that point to come into focus.

Further eye motions that may be observed as a part of a gaze tracking process are those of blinks or winks, in which the eyelid covers the eyes of the user.

As discussed previously, a display unit (such as the display element 150, 601) can be provided as part of the HMD and is configured to display images to the user wearing the HMD. Movements of the eye are performed by a user wearing an HMD whilst viewing images displayed by the HMD to move the fovea and enable detailed visual analysis of a portion of an image displayed by the HMD. Saccadic eye movements allow the user to quickly move the fovea so as to direct the gaze towards a portion of an image displayed by the display unit. During the saccadic eye movement, in addition to being unable to change a direction and a target fixation point associated with the saccadic eye movement, the human visual system is unable to perform detailed visual processing. In particular, a reduction in visual sensitivity starts approximately 50 milliseconds before a saccadic eye movement and lasts until the end of the saccadic eye movement. Consequently, during the saccadic eye movement the user may be unable to visually perceive all of the details present in the images displayed by the HMD.

Figure 12:
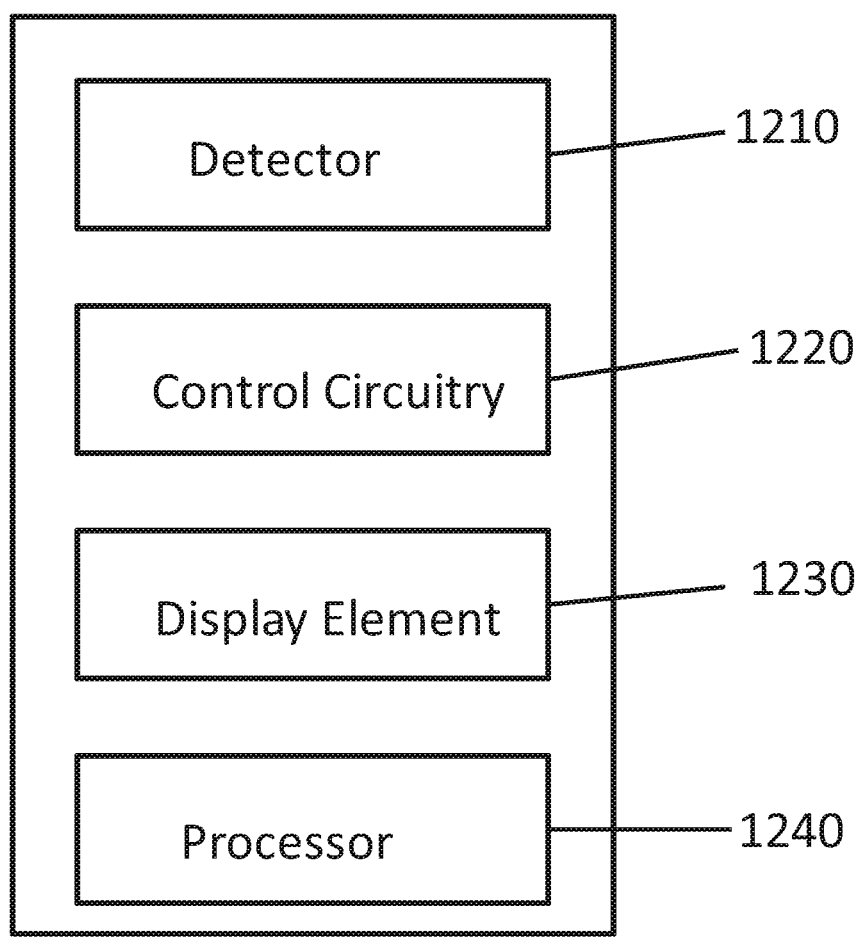
FIG. 12 schematically illustrates an HMD system for detecting saccadic eye movement and generating images for display responsive to the detected saccadic eye movement.

The operations to be discussed below relate to controlling an HMD apparatus in response to detecting saccadic eye movements to provide more efficient use of processing resources. FIG. 12 schematically illustrates an HMD apparatus 1200 for detecting saccadic eye movement of an eye of a user wearing an HMD and generating images for display responsive to the detected saccadic eye movement. In embodiments of the disclosure, the HMD apparatus 1200 comprises: at least one detector 1210 to detect movement of an eye of a user wearing the HMD 1200; control circuitry 1220 to detect saccadic movement of the eye in dependence upon the detected movement of the eye; a display unit 1230; and a processor 1240 to generate images for display to the user by the display unit, in which the control circuitry 1220 is configured to control the processor 1240 in response to the detected saccadic movement, in which the control circuitry 1220 is configured to control the processor 1240 to adjust one or more image quality parameters for one or more of the images to be displayed by the display unit 1230 during the detected saccadic movement. It will be appreciated however, that optionally the control circuitry and/or processor may be located at a separate device such as processing unit/console 830 or 910, or such a device may share their functionality. References herein to the control circuitry and/or the processor of the HMD thus encompass that this functionality is either provided by the HMD, or for the HMD by another device, or shared between the HMD and another device.

The HMD apparatus 1200 includes at least one detector 1210 for detecting movements of the eye of the user wearing the HMD 1200. In some embodiments, a single detector 1210 is provided to detect movements of one of the user's eyes and the control circuitry 1220 is configured to detect an occurrence of saccadic movement for that eye based on an output from the detector 1210 indicative of the detected eye movements. A saccadic eye movement is typically performed by both eyes at substantially the same time and therefore in some examples a detection need only be performed for one of the user's eyes to detect saccadic eye movement for the user.

In embodiments of the disclosure, the HMD apparatus 1200 comprises a first detector 1210 configured to detect the movement of the eye of the user and a second detector 1210 configured to detect movement of the other eye of the user. By providing a respective detector for each eye, eye movements can be detected for each eye and the outputs of the respective detectors 1210 indicative of the detected eye movements for the respective eyes can be provided to the control circuitry 1220. In this way, the control circuitry 1220 can receive output signals indicative of detected eye movement for the first eye and detected eye movement for the second eye, and by cross checking the detections for the respective eyes the reliability of detecting an occurrence of saccadic eye movement is improved. Herein references to detecting eye movement for an eye refer to detecting eye movement for one or both of the user's eyes.

As discussed previously with respect to FIG. 6, the HMD 1200 may comprise any number of detectors 1210 each arranged in-front of an eye of the user in the direction of the display unit 1230 so that a given detector 1210 captures an image including a respective eye. Each detector 1210 provided as part of the HMD 1200 is arranged so that a field of view associated with the detector 1210 includes at least the cornea, pupil and iris of the eye to allow detection of movements of the eye. For example, a position of the pupil and reflections associated with the cornea may be detected by the detector 1210, and an output indicative of these properties for the eye can be provided to the control circuitry 1220 to detect when the detected eye movement corresponds to saccadic eye movement. Techniques for detecting when the eye movement detected by the detector 1210 is a saccadic eye movement are discussed in more detail later.

In embodiments of the disclosure, the at least one detector 1210 comprises a camera comprising at least one of a visible light sensor and an infra-red sensor, and the camera is configured to capture images of the eye of the user. Visible light cameras may be used to capture images of the eye and in some cases the visible light emitted by the display unit 1230 may cause detectable reflections in one or more of the cornea and the pupil. Alternatively, infra-red (IR) cameras may be used with one or more light sources for generating IR light to detect reflections associated with the eye.

In embodiments of the disclosure, the control circuitry 1220 is configured to detect a gaze direction of the eye with respect to the display unit 1230 in dependence upon the detected movement of the eye. The detector 1210 is configured to detect properties associated with the eye including the pupil, cornea and iris and in some examples a position of the pupil with respect to a corneal reflection may be used by the control circuitry 1220 for detecting the gaze direction of the eye also referred to herein as the orientation of the eye. In some examples, the detector 1210 may detect the movement of the eye and also detect the gaze direction of the eye and output the detected gaze direction to the control circuitry 1220. Other detectable properties associated with the eye may be used by the detector 1210 and/or the control circuitry 1220 for detecting the gaze direction.

The HMD apparatus 1200 includes the display unit 1230 configured to display consecutive images to the user wearing the HMD 1200, where the images are at least partly generated by the processor 1240 of the HMD 1200. The HMD 1200 may comprise receiving circuitry (not shown in FIG. 12) configured to receive video signals transmitted to the HMD 1200 from another information processing apparatus such as a personal computer, games machine or a server by a wired or a wireless connection, as discussed previously. The HMD 1200 can be configured to receive the video signals and the processor 1240 is configured to generate images for display by the display unit 1230 according to the received video signals. In some examples, the HMD 1200 is operable to perform a portion of the processing for generating the images for display by the display unit 1230 and another information processing apparatus such as the personal computer, games machine or server is operable to perform another portion of the processing for generating the images for display by the display unit 1230. In this way, the processing for generating the images for display by the HMD 1200 may in some embodiments be performed in a distributed manner using a combination of processing performed by the processor 1240 of the HMD 1200 and one or more other processing units associated with other devices.

The processor (processing circuitry) 1240 provided as part of the HMD 1200 is configured to generate the respective image frames for display by the display unit 1230 according to a plurality of image quality parameters, where an image quality parameter defines an image characteristic associated with an image frame to be generated. References herein to images generated by the processor 1240 refer to generating either stereoscopic images for which left images and right images are displayed to the respective eyes or generating a single image that is displayed to both eyes. Examples of image quality parameters include: a parameter defining an image resolution for an image frame; a parameter defining a frame rate (or a frame duration) for an image frame; a parameter defining a luminance dynamic range for an image frame; and a parameter defining a colour dynamic range for an image frame. As such, the processor 1240 generates the images for display by the display unit 1230 in accordance with a plurality of image quality parameters, and in response to a detection of saccadic eye movement of the eye of the user at least one of the image quality parameters is adjusted to adjust an image characteristic associated with the images to be displayed during the saccadic eye movement. In particular, in response to a detection by the control circuitry 1220 that the eye movement detected by the detector 1210 for the user's eye is saccadic eye movement, the control circuitry 1220 is configured to control one or more image processing operations that are performed by the processor 1240 to generate the one or more images for display by the display unit 1210 to adapt at least one of the image quality parameters. By adjusting at least one of the image quality parameters, the control circuitry 1220 is able to modify image processing performed by the processor 1230 so that the image processing performed by the processor 1230 when the HMD apparatus 1200 detects saccadic eye movement is different from the image processing performed by the processor 1230 when the HMD apparatus 1200 does not detect saccadic eye movement. The control circuitry 1220 therefore controls the processor 1240 when detecting saccadic eye movement so that image processing performed whilst saccadic eye movement is detected is less resource intensive and, due to the drop in sensitivity of the human visual system during saccadic eye movement, the reduction in image quality during this period of time is not sensed by the user.

In embodiments of the disclosure, the control circuitry 1220 is configured to detect saccadic movement of the eye based on a comparison of at least one of an angular velocity (degrees/second), an angular acceleration (degrees/second$^2$) and an angular jerk (degrees/second$^3$) associated with the detected movement of the eye with one or more predetermined threshold conditions. The detection results for the eye movement of the eye are output by the detector 1210 to the control circuitry 1220 for comparison with one or more predetermined thresholds. The control circuitry 1220 can be configured to compare detection results output by the detector 1210 with at least one of a predetermined angular velocity threshold, a predetermined angular acceleration threshold and a predetermined angular jerk threshold. In a simplest case, a detected angular velocity is compared with a predetermined angular velocity threshold and the control circuitry 1220 is configured to detect saccadic eye movement of the eye in dependence upon whether the detected angular velocity exceeds the predetermined angular velocity threshold. As such, for a period of time for which the detected angular velocity exceeds the predetermined angular velocity threshold the control circuitry 1220 is configured to detect saccadic eye movement of the user, and during the detection of the saccadic eye movement by the control circuitry 1220 the control circuitry 1220 is configured to control the processor 1240 to adjust one or more of the image quality parameters. In this way, a start of the saccadic eye movement is detected at a time when the detected angular velocity exceeds the threshold and an end of the saccadic eye movement is detected at a time when the detected angular velocity stops exceeding the threshold, and during this period of time from the start to the end the control circuitry 1220 is configured to control the processor 1240. It will be appreciated that depending on the setting of the predetermined angular velocity threshold it is possible to set the threshold to a higher or lower value so that for a given saccade the total period of time for which the control circuitry 1220 detects saccadic eye movement is decreased or increased, respectively. Setting the threshold to a lower value has the advantage that the period of time for which the control circuitry 1220 controls the processor 1240 can be increased for a given saccade thereby increasing the period of time for which the image quality is adjusted leading to more efficient use of available processing resources. Setting the threshold to a higher value has the advantage that there is a decreased likelihood of false detection. In addition, by setting the threshold to a higher value, the control circuitry 1220 stops detecting saccadic eye movement at a time prior to the end of the actual saccadic eye movement by the eye so that the display unit resumes display of higher quality images at a time when the eye of the user is still performing saccadic movement but approaching the end of the saccadic movement and this can avoid the possibility that the user notices the reduction in the quality of the images as the user's visual sensitivity increases again towards the end of the saccade.

For example, a predetermined angular velocity threshold of 50 degrees per second may be selected for comparison with the detection results from the detector 1210, such that when the detection results indicate an angular velocity greater than 50 degrees/second the control circuitry 1220 is configured to detect that the detected eye movement is saccadic eye movement. It will be appreciated that other values may be used for the predetermined angular velocity threshold (e.g. 100 degrees/second) and that there is a trade off between increasing this value and decreasing this value as discussed above. In addition, a rotational velocity for a saccade and a size (magnitude of the angle rotated) of the saccade exhibit a relationship in that larger rotational velocities are associated with larger amplitude saccades. Therefore, a value of the threshold may be set appropriately so that the disclosed techniques may be performed for saccades having a size greater than a predetermined size to allow the disclosed techniques to be implemented for saccades for which the greatest resource savings can be made. In some examples, a horizontal component of the detected eye movement may be compared with a horizontal threshold for the angular velocity and a vertical component of the detected eye movement may be compared with a vertical threshold for the angular velocity.

It will be appreciated that a predetermined angular acceleration threshold (degrees/sec$^2$) and/or a predetermined angular jerk threshold (degrees/sec$^3$) can be employed in a similar manner to that described above for the predetermined angular velocity threshold. By comparing properties of the rotation of the user's eye with one or more thresholds in this way the onset of saccadic eye movement can be detected and the termination of the saccadic eye movement can be detected, and one or more of the image quality parameters are adjusted for the duration of the detection of the saccadic eye movement.

Example techniques for detecting saccades in eye movement data and for calculating parameters for saccade detection are discussed in Behrens, F., MacKeben, M. & Schröder-Preikschat, W., "An improved algorithm for automatic detection of saccades in eye movement data and for calculating saccade parameters", Behaviour Research Methods, 2010, 42(3), 701-708. Other example techniques for detecting saccades are discussed in Wyatt, H "Detecting saccades with jerk", Vision research, Vol. 38, 2147-2153, 1998. The contents of these disclosures are incorporated by reference into this description in their entirety.

In embodiments of the disclosure, the control circuitry 1220 is configured to calculate a period of time representing a predicted duration for the detected saccadic movement of the eye in dependence upon the detected movement of the eye. As discussed previously, due to the ballistic nature of saccadic eye movement, certain detectable properties of the eye movement associated with a given saccade exhibit interdependence. Detection of one property of the eye movement for a saccade can be used to calculate another property of the eye movement for the saccade. The detector 1210 is configured to detect eye movement and the control circuitry 1220 is configured to detect saccadic eye movement in dependence upon the detected eye movement. In response to the control circuitry 1220 detecting saccadic eye movement, the control circuitry 1220 is configured to calculate a period of time for which the detected saccadic eye movement is predicted to last. Therefore, one or more properties detected during the saccade can be used during the saccade (while the saccade is still ongoing) to calculate a duration for the saccade and thus predict a time in the future at which the saccade will end. Using the calculated period of time, the control circuitry 1220 can predict how long a given saccade is expected to last and one or more image quality parameters can be selected for adjustment according to the predicted length of the saccade.

In embodiments of the disclosure, the control circuitry 1220 is configured to control the processor 1240 to adjust one or more of the image quality parameters for one or more of the images to be displayed by the display unit 1210 during the detected saccadic movement in dependence upon the calculated period of time. By calculating an amount of time for which the saccade is predicted to last, the control circuitry 1220 can predict a time at which the saccade will end. The control circuitry 1220 can thus control the processor 1240 accordingly to generate images having a lower image quality up to the time at which the saccade is predicted to end. Further details regarding controlling the processor 1240 in dependence upon the predicted duration of the saccade are discussed later.

In embodiments of the disclosure, the control circuitry 1220 is configured to calculate the period of time representing the predicted duration for the detected saccadic movement in dependence upon a maximum angular velocity (peak angular velocity) associated with the detected movement of the eye. The ballistic nature of a saccade is such that a magnitude of a peak angular velocity for the saccade is correlated with an amplitude of the saccade, where an amplitude of a saccade is the amount of angular rotation performed by the eye during the saccadic movement of the eye. For amplitudes up to 15 or 20 degrees, the peak angular velocity of the saccade varies linearly with respect to the amplitude (this is referred to as the saccadic main sequence). For amplitudes larger than 20 degrees, the peak angular velocity starts to plateau (nonlinearly) toward the maximum angular velocity attainable by the eye which is typically attained for amplitudes of around 60 degrees. For instance, a 10 degree amplitude is typically associated with a peak angular velocity of 300 degrees per second, and 30 degree amplitude is typically associated with a peak angular velocity of 500 degrees per second. As such using a predetermined relationship between the peak angular velocity and amplitude, the amplitude of a saccade can be calculated during the saccade (prior to completion of the saccade) and a value representing a total duration of the saccade can be calculated. The detector 1210 is configured to detect movement of the eye and to output the detection results to the control circuitry 1220 including the detected angular velocity. By monitoring the detection results including the detected angular velocity for the eye during a saccade, the control circuitry 1220 can detect the maximum angular velocity for the eye and calculate the period of time representing a predicted duration for the saccade.

As an alternative or in addition to calculating a period of time for the saccade using a magnitude of a peak angular velocity, the control circuitry 1220 may employ a another calculation to calculate the period of time representing the predicted duration for the detected saccade on the basis of a detection of a gaze direction (eye orientation) at the start of the saccade and a gaze direction corresponding to the peak angular velocity. During a saccade in which the eye rotates from a first orientation corresponding to the start of the saccade to a second orientation corresponding to the end of the saccade, the angular velocity of the eye initially increases until reaching the peak angular velocity at approximately halfway through the rotation of the saccade and then decreases until the eye reaches the second orientation. In some examples, the control circuitry 1220 is configured to monitor the detection results from the detector 1210 and to detect a first eye orientation corresponding to the start of the saccade and an eye orientation corresponding to the peak angular velocity. The control circuitry 1220 can thus calculate a magnitude of the saccade on the basis that the eye orientation corresponding to the peak angular velocity represents approximately the midpoint of the saccade and the amplitude of the saccade is approximately double the angle from the eye orientation corresponding to the peak angular velocity to the first eye orientation, and thereby calculate the period of time for the saccade based on the amplitude calculated in this way. Alternatively or in addition, the control circuitry 1220 may employ another calculation to calculate the period of time representing the predicted duration for the detected saccade on the basis of a start time for the saccade and a time associated with the maximum angular velocity (peak angular velocity). By detecting a time at which the saccade starts and a time at which the peak angular velocity is detected, a total duration for the saccade can be calculated by multiplying the period of time from the start time of the saccade to the time of the peak angular velocity by two in order to obtain a value representing the predicted duration for the detected saccadic movement. For example, using timestamps associated with detection results generated by the detector 1210, a timestamp associated with the detection result for the first eye orientation and a timestamp associated with the eye orientation for the peak angular velocity can allow the period of time from the start of the saccade to the peak angular velocity for the saccade to be detected.

In embodiments of the disclosure, the control circuitry 1220 is configured to calculate the period of time representing the predicted duration for the detected saccadic movement in dependence upon a direction associated with the detected saccadic movement. The detector 1210 is configured to detect movement of the eye and output detection results for the movement to the control circuitry 1220 to perform detection of saccadic eye movement. In response to the control circuitry 1220 detecting saccadic eye movement, the control circuitry 1220 can be configured to calculate a period of time for which the detected saccadic eye movement is predicted to last in dependence upon the direction of the saccadic eye movement. In a simplest case, a detected orientation of the eye is compared with a predetermined orientation, where the predetermined orientation corresponds to a gaze direction for which the user is looking straight ahead in the centre of the field of view of the eye. This comparison provides an indication of a deviation between the orientation of the eye at the start of the saccade and an orientation corresponding to the centre of the field of view, and allows an upper limit for the duration of the detected saccadic eye movement to be calculated.

Figure 13:
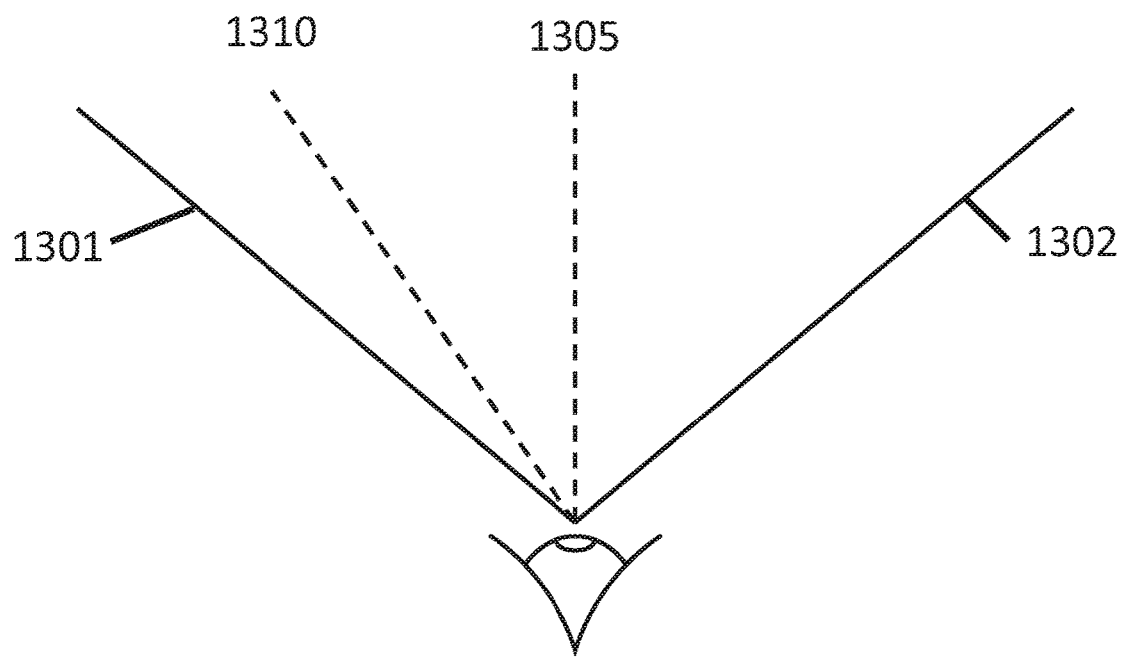
FIG. 13 schematically illustrates an example of a horizontal field of view of an eye.

FIG. 13 schematically illustrates an example of a horizontal field of view of an eye in which the solid lines 1301, 1302 represent a limit of the field of view of the eye in the horizontal direction and the dotted line 1305 represents a centre of the horizontal field of view. It will be appreciated the field of view in the vertical direction may be represented in a similar manner and with a different limit on the angular range according to the properties of the human visual system. The dotted line 1310 in FIG. 13 represents a gaze direction of the eye in the horizontal direction at a start of a saccade, and in this example the line 1310 is offset relative to the centre of the field of view 1305 such that a maximum possible amplitude of a saccadic eye movement of the gaze direction away from the centre of the field of view in the horizontal direction (towards the line 1301) is smaller than a maximum possible amplitude of a saccadic eye movement towards the centre of the field of view. The control circuitry 1220 can detect the gaze direction of the eye at the start of the saccade (represented by the line 1310) and a direction of the movement of the eye in the horizontal direction away from the gaze direction at the start of the saccade. On the basis of the detected gaze direction of the eye at the start of the saccade and the initial direction of movement in the horizontal direction, the control circuitry 1220 can calculate an upper limit for the duration of the saccade given that the gaze direction is limited to the field of view defined by the lines 1301, 1302. Similarly, on the basis of the detected gaze direction of the eye at the start of the saccade and an initial direction of movement in the vertical direction, the control circuitry 1220 can calculate an upper limit for the duration of the saccade given that the gaze direction is limited to the field of view in the vertical direction. Calculating an upper limit for the period of time representing the predicted duration for the detected saccadic movement in this way represents a particularly fast technique in that a value can be calculated without having to wait for detection of the peak angular velocity.

In some examples, the control circuitry 1220 can be configured to detect a gaze direction for the eye at the start of the saccade and to detect a gaze direction for the eye corresponding to the peak angular velocity. Since the direction of movement of the eye during the saccade is fixed (i.e. the direction of movement of the eye cannot be changed once the saccade is initiated) a final gaze direction for the eye can be calculated based on the gaze direction at the start of the saccade and the gaze direction corresponding to the peak angular velocity. Specifically, the control circuitry 1220 can calculate the final gaze direction on the basis that the gaze direction corresponding to the peak angular velocity represents approximately the midpoint of the saccade. The control circuitry 1220 can be configured to calculate a vector having a direction representing the movement direction of the eye between the initial gaze direction at the start of the saccade and the gaze direction corresponding to the peak angular velocity, and by doubling the magnitude of the vector to extrapolate the vector in the movement direction of the eye a final gaze direction can be calculated. Therefore, on the basis of the initial gaze direction and the calculated final gaze direction for the saccade, an amplitude of the saccade can be calculated and using the amplitude calculated in this way a period of time can be calculated representing a predicted duration for the saccade.

In some examples, by calculating the final gaze direction in this way the control circuitry 1220 can identify the intended fixation point for the saccade during the saccade (before the saccade is completed) and can control the processing circuitry 1240 during the detection of the saccade to begin generating the images for display after the completion of the saccade by applying foveal rendering for the images in which a portion of the image within a predetermined distance of the intended fixation point in the image is generated with a higher image resolution than other portions of the image. In other words, the calculation of the final gaze direction can allow processing to be performed by the processor 1240 prior to the end of the saccade according to the predicted end point for the saccade so that predictive foveal rendering can be implemented.

Figure 14:
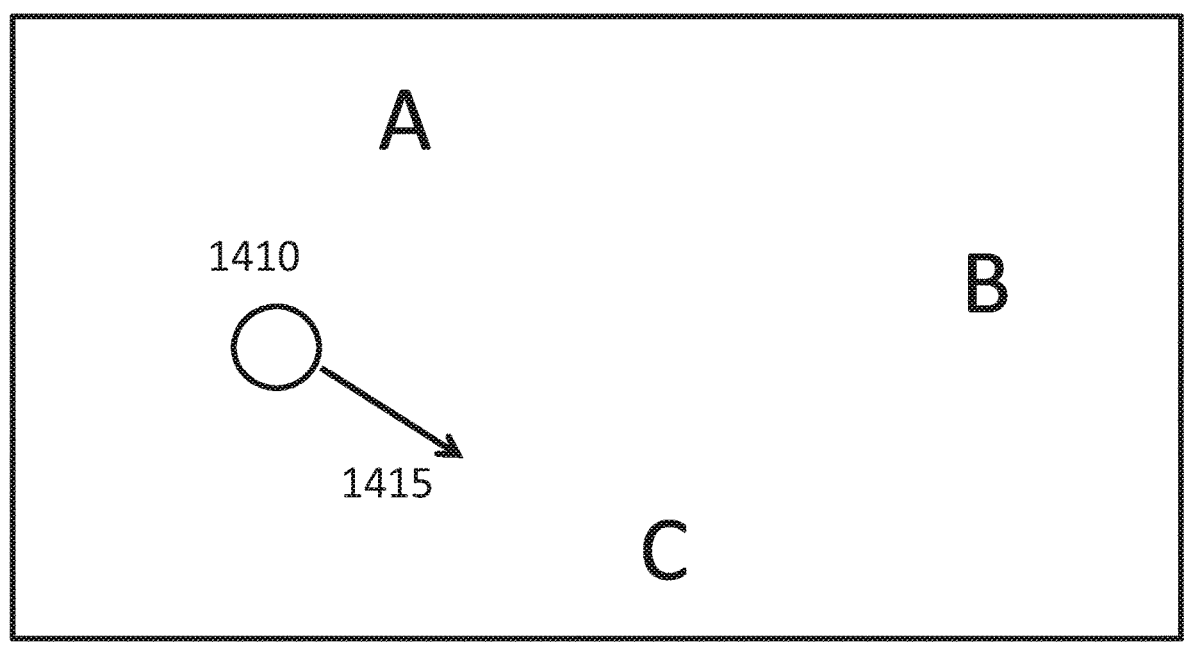
FIG. 14 schematically illustrates an example of an image comprising target objects.

In embodiments of the disclosure, the control circuitry 1220 is configured to calculate a period of time representing a predicted duration for the detected saccadic movement of the eye in dependence upon a position of a point of attention in a given image corresponding to a start of the detected saccadic movement and a position of a target object in the given image, in which the control circuitry 1220 is configured to select the target object in dependence upon a direction associated with the detected saccadic movement and the position of the target object in the given image. FIG. 14 schematically illustrates an example of a given image 1400 generated by the processor 1240 comprising target objects A, B and C. For example, the respective objects A, B and C may be respective virtual avatars in a virtual environment, or object A may correspond to an object such as a car whereas object B may represent a different type of object such as a lamp post. The control circuitry 1220 is configured to detect a gaze direction of the eye with respect to the display unit 1230, and the circle 1410 in FIG. 14 represents a point of attention in the given image 1400 corresponding to the detected gaze direction. In response to detecting saccadic eye movement, the control circuitry 1220 is configured to calculate the period of time representing the predicted duration of the saccadic eye movement. By detecting the point of attention 1410 in the given image 1400 at the start of the saccadic eye movement, a direction in which the gaze direction moves with respect to the point of attention 1410 can be used to predict which target object of the plurality of target objects A, B and C in the given image is the intended target fixation point for the saccade. In the example shown, the control circuitry 1220 detects that the saccadic eye movement moves away from the point of attention 1410 in a direction indicated by the arrow 1415, and the control circuitry 1220 predicts that the target object C corresponds to the target fixation point for the saccade in dependence upon the direction 1415. In particular, by detecting the direction 1415, the position of the point of attention 1410 and the positions of the plurality of target objects, a vector associated with the direction 1410 can be calculated and one of the plurality of target objects can be selected in dependence upon whether the vector intersects one of the positions of the target objects A, B and C in the given image 1400. In this way, the target object in the given image 1400 can be selected without having to wait for the detection of the occurrence of the peak angular velocity for the saccade, and both the starting fixation point 1410 and the end fixation point (the position of the target object C) can be identified during the saccade and their separation used to calculate a period of time representing the predicted duration for the saccade. Hence more generally, the control circuitry 1220 is configured to calculate a value for the period of time representing the predicted duration of the saccadic eye movement in dependence upon a magnitude of the saccade required to change the gaze direction from the point of attention to the selected target object.

Whilst the above example has been described with reference to three target objects it will be appreciated that the technique can be implemented for any number of target objects in a given image. In some examples, the given image 1400 may comprise a single target object (e.g. only the target object C) and the control circuitry is configured to select the target object C as the predicted target for the saccadic eye movement in dependence upon whether the vector associated with the detected direction 1410 intersects the position of the target object C in the given image 1400 so that the target object C is either selected or not selected by the control circuitry 1220. Hence more generally, the control circuitry 1220 can be configured to select a target object in a given image as the target fixation point for the detected saccade according to a spatial relationship between the position of the initial point of attention, the direction of the saccade and the position of the target object. In the case where the given image comprises a plurality of target objects (e.g. objects A, B and C in FIG. 14), one target object can be selected from the plurality of target objects according to a spatial relationship between the position of the initial point of attention, the direction of the saccade and the position of each target object. Hence, the control circuitry 1220 can be configured to select the target object from a plurality of target objects in the given image in dependence upon the direction associated with the detected saccadic movement and the positions of the target objects in the given image.

In embodiments of the disclosure, the selected target object (e.g. the target object C in FIG. 14) is a predicted target object for the detected saccadic movement, and the control circuitry 1220 is configured to control the processor 1240 to generate, during the detected saccadic movement, at least one image to be displayed by the display unit 1230 after the detected saccadic movement by generating a portion of the at least one image within a predetermined distance of the selected target object with a higher image resolution than a second portion of the at least one image not within the predetermined distance of the selected target object. The target object is selected in dependence upon the direction for the detected saccadic eye movement, and the position of the target object represents a position at which the saccade is predicted to end. Consequently, during the saccadic eye movement from the point of attention at the start of the saccade (e.g. point of attention 1410) to the position on the display unit 1230 corresponding to the position of the target object in the given image 1400, the control circuitry 1220 can control the processor 1230 to generate one or more subsequent images for display after the saccade has been completed by the eye by generating the one or more subsequent images with a higher resolution portion surrounding the fixation point at the end of the saccade. In other words, images can be generated in advance based on the predicted location of the final fixation point of the saccade and foveated rendering can be performed in a predictive manner.

As discussed previously, the control circuitry 1220 is configured to control the processor to adjust one or more image quality parameters for one or more of the images to be displayed by the display unit during the detected saccadic movement. The control circuitry 1220 is configured to adjust an image quality parameter defining one or more from the list consisting of: an image resolution for one or more of the images to be displayed by the display unit; a frame rate for at least a subset of the images to be displayed by the display unit; a luminance dynamic range for one or more of the images to be displayed by the display unit; and a colour dynamic range for one or more of the images to be displayed by the display unit.

A first image quality parameter may define the image resolution of the image frames generated by the processor 1240. The control circuitry 1220 is configured to adjust the first image quality parameter in response to the detected saccadic eye movement to adjust the image resolution for the image frames so that lower resolution image frames are generated for display by the display unit 1230 during the detected saccadic eye movement and higher resolution image frames are generated for display by the display unit 1230 when no saccadic eye movement is detected. Consequently, the higher resolution images (e.g. N×M pixels) are generated for display to the user when no saccadic eye movement is detected (e.g. when the user's eye is performing a smooth pursuit type of eye motion) and the lower resolution images having fewer pixels (e.g. Q×R pixels, where the sum of Q×R is less than the sum of N×M) are generated for display to the user during detection of saccadic eye movement so that images requiring less processing are generated for display during the period for which there is a reduction in the sensitivity of the human visual system. Similarly, the resolution of textures using within an image may likewise be varied.

A second image quality parameter may define the frame rate for the images generated by the processor 1240. The second image quality parameter can be adjusted in response to the detected saccadic eye movement to adjust the frame rate so that images generated for display during the detected saccadic eye movement have a lower frame rate and images generated for display at a time when no saccadic eye movement is detected have a higher frame rate. For example, the processor 1240 is configured to generate images for display by the display unit 1230 when no saccadic eye movement is detected according to a frame rate of X Hz (e.g. X=60 Hz or 100 Hz) and in response to detecting saccadic eye movement the control circuitry 1220 controls the processor to adjust the second image quality parameter to lower the frame rate to generate image frames according to a frame rate of Y Hz, where Y is less than X (e.g. Y=less than 60 Hz or less than 100 Hz).

A third image quality parameter may define the luminance dynamic range for the images generated by the processor 1240. The third image quality parameter can be adjusted in response to the detected saccadic eye movement to adjust the luminance dynamic range so that images generated for display during the detected saccadic eye movement have a lower luminance dynamic range and images generated for display at a time when no saccadic eye movement is detected have a higher luminance dynamic range. In this way, images including pixels with a larger range of luminance values can be generated for display when no saccadic eye movement is detected, whereas images including pixels with a smaller range of luminance values can be generated for display when saccadic eye movement is detected to improve processing efficiency.

A fourth image quality parameter may be provided to define the colour dynamic range so that images having a high colour dynamic range are generated for display when no saccadic eye movement is detected and images having a lower colour dynamic range are generated for display when detecting saccadic eye movement. For example, a larger bit depth may be used for RGB channels for representing a colour of a pixel when no saccadic eye movement is detected and a smaller bit depth may be used for the RGB channels during saccadic eye movement. It will be appreciated that YUV colour encoding may similarly be used.

A fifth image quality parameter may relate to the application of (or level of) post-processing or effects applied to an image. Examples of such processing include anti-aliasing, anisotropic filtering, bloom, motion blur, bump-mapping or tessellation, ambient occlusion (for realistic shadows, etc) and the like. For a saccade, one or more such effects may be disabled as a function of the fifth quality parameter, or reduced in quality (for example in the case of anti-aliasing, the number of passes can be reduced).

Figure 15:
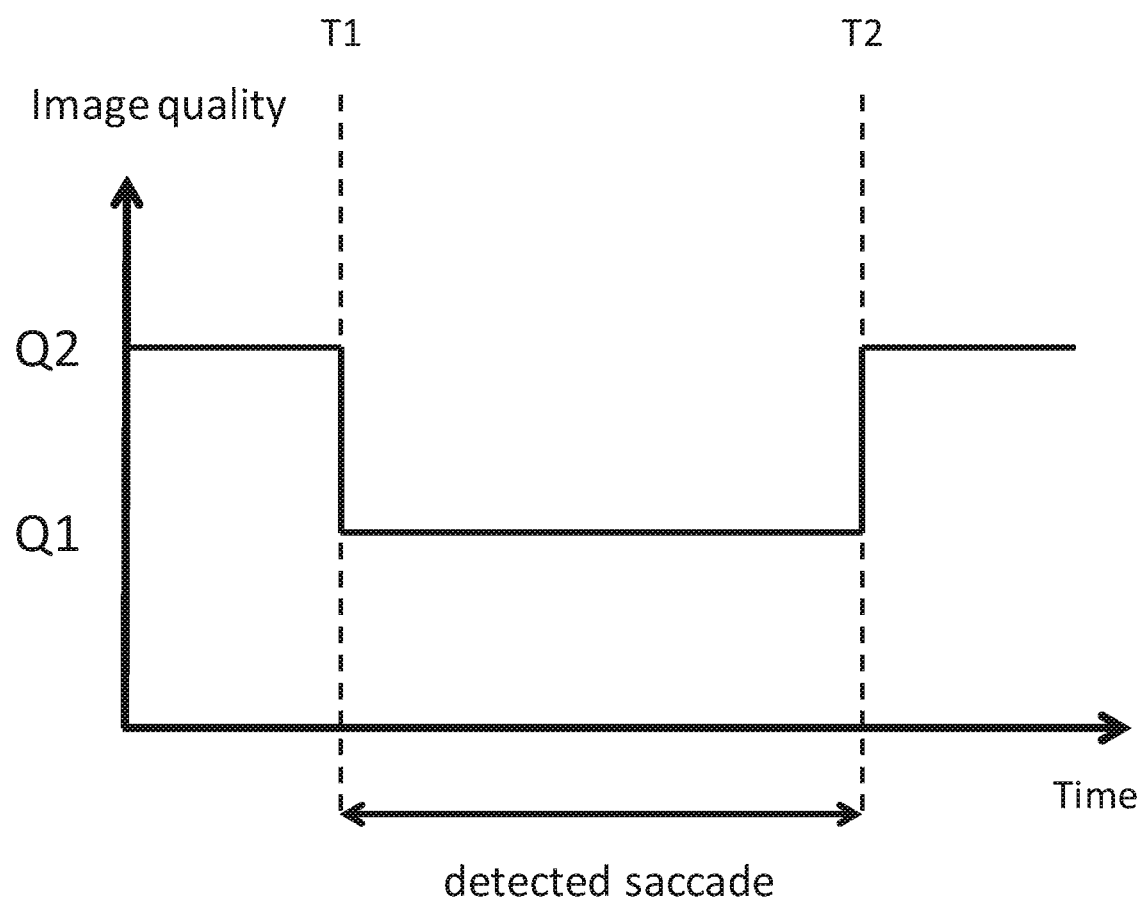
FIG. 15 schematically illustrates an example of adjusting an image quality parameter in response to saccadic eye movement.

FIG. 15 schematically illustrates an example of adjusting an image quality parameter in response to saccadic eye movement detected by the control circuitry 1220. Time is represented in the horizontal axis and image quality is represented in the vertical axis, where time increases from left to right and the value Q2 represents a value indicative of a higher image quality and the value Q1 represents a value indicative of a lower image quality. The processor 1240 is configured to generate the respective image frames for display by the display unit 1210 according to one or more of the image quality parameters, where a respective image quality parameter defines a respective image quality characteristic for an image frame to be generated. The control circuitry 1220 can adjust one or more of the plurality of image quality parameters to adjust one or more image quality characteristics for one or more image frames generated for display by the display unit 1230 whilst saccadic eye movement is detected by the control circuitry 1220. In the example shown in FIG. 15 the control circuitry 1220 controls the processor 1240 in response to the saccadic movement detected as starting at the time T1 and ending at the time T2 by adjusting one of the image quality parameters (e.g. any of the first, second, third, fourth or fifth image quality parameters discussed above) for the images to be displayed by the display unit 1230 of the HMD 1200 during the time period from T1 to T2.

The time period from T1 to T2 may range from 20 milliseconds to 200 milliseconds depending on the amplitude of the saccade. As such, for a saccade having a duration of 100 milliseconds, in the case where for example the frame rate is 100 Hz prior to the detection of the saccade and no change in frame rate occurs, this would result in 10 image frames being displayed in the time period from T1 to T2 (for a frame rate of 100 Hz, each image frame is displayed for a time period of $\frac{1}{100}=10$ milliseconds). However, during the saccade the visual sensitivity of the human visual system drops such that details in the displayed image frames are less perceptible. As such, a reduction in the image quality can be implemented for at least some of the images frames displayed during this time period and the image quality can be returned to its previous setting used prior to the detected saccade at the end of the time period T1 to T2.

For example, the control circuitry 1220 may adjust the first image quality parameter defining the image resolution for the frames generated by the processor 1240 so that lower resolution image frames are generated and displayed during the time period T1 to T2 and higher resolution image frames are generated and displayed prior to the time T1 (prior to the saccade) and after the time T2 (after the saccade). In some examples, the image resolution is reduced for all of the image frames displayed during the time period T1 to T2. However, in other examples, a last image frame or one or more last image frames to be displayed during the time period T1 to T2 may be generated and displayed with a higher image resolution than the other image frames generated and displayed during the time period T1 to T2, so that as the saccadic eye movement approaches the target fixation point and the human visual sensitivity gradually increases, the last image frame or the last one or more image frames displayed just before the end of the saccade are higher in resolution. It will be appreciated that varying the image resolution of the image frames during the saccade in this way requires a prediction of when the saccade will end so that images can be displayed accordingly prior to detecting the end of the saccade. This is discussed in more detail below.

It will be appreciated that instead of or in addition to adjusting the first image quality parameter to reduce the image resolution of the image frames displayed during the time period T1 to T2, any of the second image quality parameter defining the frame rate, the third image quality parameter defining the luminance dynamic range or the fourth image quality parameter defining the colour dynamic range may be adjusted to reduce an amount of processing performed for generating the images displayed during the time period T1 to T2. In some cases, the control circuitry 1220 is configured to adjust more than one of the plurality of image quality parameters so that for example both the image resolution and the frame rate, or both the image resolution and the luminance dynamic range, or both the frame rate and the colour dynamic range may be reduced for the images displayed during the time period T1 to T2.

In embodiments of the disclosure, the control circuitry 1220 is configured to control the processor 1240 to adjust an image resolution for a plurality of images to be displayed by the display unit 1230 during the detected saccadic movement in dependence upon the calculated period of time representing the predicted duration for the detected saccadic eye movement by generating one or more images having a first image resolution and at least one image having a second image resolution, in which the first image resolution is lower than the second image resolution, and in which the at least one image having the second image resolution is to be displayed by the display unit after the one or more images having the first image resolution. Referring again to FIG. 15 illustrating a time T1 at which a start of the saccade is detected by the control circuitry 1220 and a time T2 at which an end of the saccade is detected by the control circuitry 1220, the control circuitry 1220 can be configured to calculate the period of time representing the predicted duration T1-T2 of the saccade prior to the end of the saccade in dependence upon the properties of the detected eye movement, such that the time T2 at which the saccade ends can be predicted. For example, using the above discussed technique regarding selection of the target object C, the control circuitry 1220 may calculate the period of time T1-T2 so that the time T2 at which the saccade will end is predicted. The control circuitry 1220 can be configured to control the processor during the saccade in dependence upon the calculated period of time.

Figure 16A:
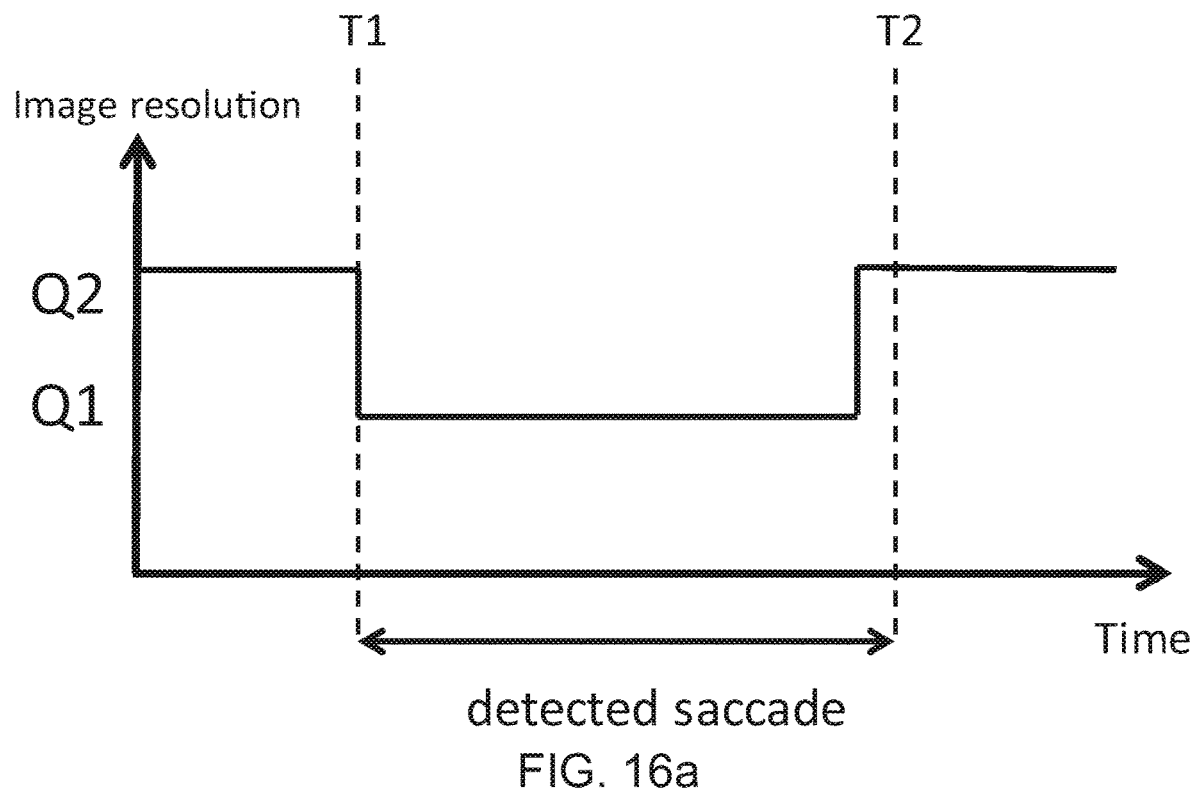
FIGS. 16a and 16b schematically illustrate examples of adjusting an image resolution in dependence upon a calculated period of time representing a predicted duration for the detected saccadic movement.

FIG. 16a schematically illustrates an example of adjusting an image resolution during detected saccadic movement in dependence upon a calculated period of time representing a predicted duration for the detected saccadic movement. In response to detecting the start of the saccade at T1, the control circuitry 1220 controls the processor 1240 to generate image frames for display having the first image resolution Q1 lower than the second image resolution Q2 used prior to the start of the saccade. Then, depending on the calculated period of time T1-T2 the control circuitry 1220 controls the processor 1240 by adjusting the image quality parameter defining the image resolution so that at least one image having the second image resolution Q2 is displayed after the one or more images having the first image resolution Q1 and before the time T2. In this way, for the plurality of images displayed during the saccade, one or more of the plurality of images can be generated and displayed according to a first image resolution and at least one of the plurality of images to be displayed after the one or more images having the first image resolution can be generated and displayed according to second image resolution higher than the first image resolution. Hence more generally, the image resolution of the images displayed during the saccade can be adjusted to reflect changes in the user's visual sensitivity as the eye approaches the end of the saccade.

Figure 16B:
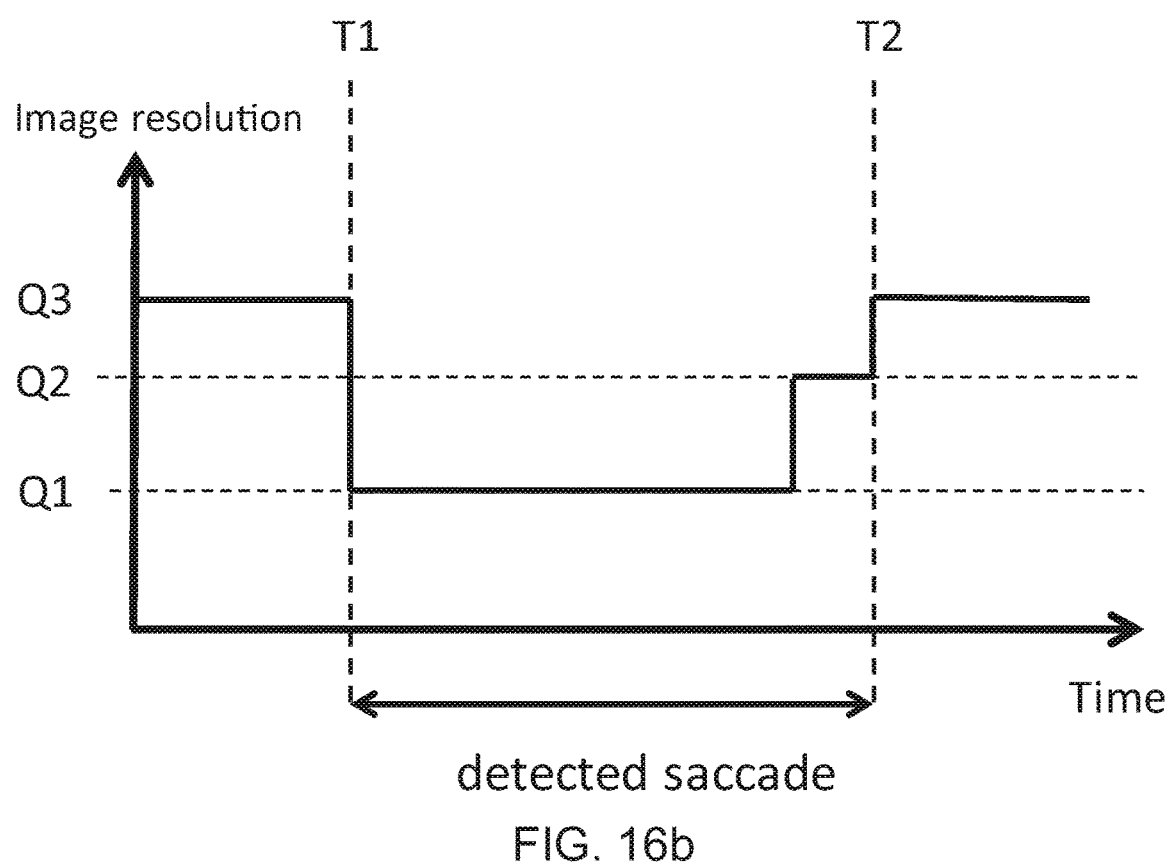

It will be appreciated that whereas in the above example shown in FIG. 16a the one or more last image frames displayed during the time T1-T2 are described as having a second image resolution Q2 that is substantially the same as the image resolution used for displaying images when no saccade is detected, the second image resolution Q2 used for the one or more last image frames may actually be higher than the first image resolution and lower than an image resolution used for displaying images when no saccade is detected. FIG. 16b schematically illustrates an example in which one or more image frames having a first image resolution Q1 are generated for display, then one or more image frames having a second image resolution Q2 higher than the first image resolution are generated for display just before the time T2 at which the saccade is predicted to end, and at the time T2 image frames having a third image resolution Q3 higher than the second image resolution are generated for display (horizontal dashed lines are included in FIG. 16b for indicating the first image resolution Q1 and the second image resolution Q2). Therefore, the image resolution of the images frames displayed by the HMD 1200 can be controlled so that as the user's visual sensitivity increases towards the end of the saccade the image resolution is increased appropriately.

In embodiments of the disclosure, the control circuitry 1220 is configured to control the processor 1240 to adjust a frame rate for a plurality of images to be displayed by the display unit 1230 during the detected saccadic movement in dependence upon the calculated period of time by generating one or more images each having a first frame duration corresponding to a first frame rate and at least one image having a second frame duration corresponding to a second frame rate, in which the first frame rate is a lower frame rate than the second frame rate, and in which the at least one image having the second frame duration is to be displayed by the display unit 1230 after the one or more images having the first frame duration. In a manner similar to that described previously with reference to FIGS. 16a and 16b regarding image resolution, the control circuitry 1220 can be configured to adjust a frame rate during detected saccadic movement in dependence upon the calculated period of time representing a predicted duration for the detected saccadic movement. For example, for a frame rate of 100 Hz, each image frame has a frame duration of 10 milliseconds. The processor 1240 can be configured to generate images according to a predetermined frame rate (e.g. 100 Hz) when no saccade is detected, and in response to detecting a saccade the processor can be controlled to generate images according to a lower frame rate (e.g. 60 HZ or 30 Hz). It will be appreciated that there are a range of possible predetermined frame rates that may be used and that at least the first frame rate is a lower frame rate than the predetermined frame rate (e.g. 100 Hz) used when no saccade is detected, such that processing efficiency is improved by generating images for display during the saccade according to the first frame rate. The first frame rate and the second frame rate are different from each other, the first frame rate is lower than the second frame rate, and the first and second frame rates may take any appropriate value according to the properties of the system. The second frame rate is either lower than the predetermined frame rate used for image generation when no saccade is detected (in a manner similar to that shown in FIG. 16b) or is substantially the same as the predetermined frame rate used for image generation when no saccade is detected (in a manner similar to that shown in FIG. 16a).

Therefore, in response to detecting the start of the saccade at T1, the control circuitry 1220 can control the processor 1240 to generate image frames for display having a first frame rate, and therefore each respective image frame has a corresponding first frame duration (frame length) representing an amount of time for which the image frame is displayed (e.g. 16.6 milliseconds for a second frame rate of 60 Hz or 33.3 milliseconds for a frame rate of 30 Hz). Then, depending on the calculated period of time T1-T2 the control circuitry 1220 controls the processor 1240 by adjusting the image quality parameter defining the frame rate so that at least one image having a second frame duration shorter than the first frame duration is displayed after the one or more images having the first frame duration and just prior to the end of the saccade at T2. In this way, for the plurality of images displayed during the saccade, one or more of the plurality of images can be generated and displayed according to a first frame duration and at least one of the plurality of images to be displayed after the one or more images having the first frame duration can be generated and displayed according to second frame duration shorter than the first frame duration. Hence, the frame rate of the images displayed during the saccade can be adjusted to reflect changes in the user's visual sensitivity as the eye approaches the end of the saccade.

In some examples, a situation may arise in which images are generated and displayed having a first frame duration of X milliseconds during the detected saccade, and if the last image frame of the plurality of image frames were to be displayed with the first frame duration of X milliseconds the last image frame may continue to be displayed by the display unit 1230 for a period of time after the end of the saccade T2 such that the user may be able observe the lower frame rate. This situation is more likely to arise for cases in which a relatively large first frame duration is used (e.g. 33.3 milliseconds corresponding to a frame rate of 30 Hz). For example, if the last image frame having a frame duration of 33.3 milliseconds is initially displayed at a time that is 10 milliseconds before the time T2 at which the saccade is predicted to end, then the last image frame would continue to be displayed by display unit for 33.3—10=23.3 milliseconds after the time T2 and the reduction in the frame rate may be noticeable by the user. The control circuitry 1220 can be configured to control the processor 1240 in dependence upon the calculated period of time representing the predicted duration for the detected saccadic movement by generating one or more images each having the first frame duration corresponding to the first frame rate and by generating the last image frame having a second frame duration shorter than the first frame duration, where the second frame duration is selected so that display of the second frame ends within a predetermined period of time after the end of the saccade T2. Consequently, the last image frame of the plurality of images frames displayed during the detected saccade may be shortened in duration so that the last image frame continues to be displayed after the end of the saccade (after the point in time T2) and a next image frame is displayed from a predetermined time after the end of the saccade. In the example described above, the last image frame may be shortened from 33.3 milliseconds to 20 milliseconds so that the display of the last image frame ends 10 milliseconds after the end of the saccade at T2 so that the reduction in the frame rate is not noticeable by the user.

It will be appreciated that the control circuitry 1220 can be configured to adjust one or more of the image resolution, frame rate, luminance dynamic range and colour dynamic range, or post-processing/effects features in response to detecting saccadic eye movement in the manner described above with reference to FIGS. 16a and 16b.

In embodiments of the disclosure, the processor 1240 is configured to generate a first portion of an image within a predetermined distance of a point of attention in the image corresponding to the detected gaze direction with a higher image resolution than a second portion of the image not within the predetermined distance of the point of attention, and in response to the detected saccadic movement the control circuitry 1220 is configured to control the processor 1240 to adjust an image resolution for a subsequent image to be displayed by the display unit by decreasing the image resolution for the first portion. The gaze direction of the eye (or eyes) can be detected by the control circuitry 1220 and used to identify a point of attention in an image displayed by the display unit 1230. In dependence upon the gaze direction, the image can be generated by the processor 1240 with a first portion having a first image resolution and a second portion having a second image resolution, where the first portion surrounds the point of attention in the image and the first image resolution is higher than the second image resolution by applying foveal rendering for the images. In response to the control circuitry 1220 detecting saccadic eye movement, the control circuitry 1220 controls the processor 1240 to decrease the image resolution for the first portion in one or more subsequent images to be generated and displayed, since the drop in visual sensitivity during the saccade is such that the user is unable to perceive detailed image information. For example, the processor 1240 may be configured to generate the first portion of the image in accordance with an image quality parameter defining the first image resolution and to generate the second portion of the image in accordance with an image quality parameter defining the second image resolution. In response to the control circuitry 1220 detecting saccadic eye movement, the control circuitry 1220 can adjust at least the image quality parameter defining the first image resolution to reduce the image resolution for the first portion of the image that follows the detected gaze direction. Alternatively or in addition, the control circuitry 1220 can adjust both the image quality parameter defining the first image resolution and the image quality parameter defining the second image resolution to reduce both the first and second image resolutions for the first and second portions, respectively.

In embodiments of the disclosure, in response to the detected saccadic movement the control circuitry 1220 is configured to control the processor 1240 to adjust the image resolution for the subsequent image by setting the image resolution for the first portion and the image resolution for the second portion to be substantially the same. The control circuitry 1220 can either adjust just the image quality parameter defining the first image resolution to set the first image resolution and the second image resolution to be substantially equal so that the first and second portions in the subsequent image have substantially the same image resolution. Alternatively, the control circuitry 1220 can adjust both the image quality parameter defining the first image resolution and the image quality parameter defining the second image resolution to reduce both the first and second image resolutions and to set them to be substantially the same.

As discussed previously with respect to FIG. 14, the control circuitry 1220 can be configured to calculate a period of time representing the predicted duration for the detected saccadic movement of the eye in dependence upon a position of a point of attention in a given image corresponding to a start of the detected saccadic movement and a position of a target object in the given image 1400. In embodiments of the disclosure, the selected target object is a predicted target object for the detected saccadic movement, and the control circuitry 1220 is configured to control the processor 1240 to generate, during the detected saccadic movement, at least one image to be displayed by the display unit 1230 after the detected saccadic movement by generating a portion of the at least one image within a predetermined distance of the selected target object with a higher image resolution than a second portion of the at least one image not within the predetermined distance of the selected target object. In the example shown in FIG. 14, the target object C is selected by the control circuitry 1220 as being the intended target of the saccade on the basis of the direction of eye movement for the saccade and the position of the target object C. On this basis, the control circuitry 1220 can calculate the period of time representing the predicted duration (length) of the saccade so that images can be generated for display during the saccade with a lower image quality. In addition to identifying the target object C as the target of the saccade to predict the duration of the saccade, the control circuitry 1220 can control the processing circuitry 1240 to generate one or more images to be displayed after the end of the saccade, in which in each of the one or more images includes a first portion within a predetermined distance of the target object that is generated with a higher image resolution than a second portion of the image not within the predetermined distance of the target object. In this way, processing can be performed in advance of the user's gaze reaching the end point of the saccade to generate the images to be displayed having a higher image resolution for the target object.

Figure 17:
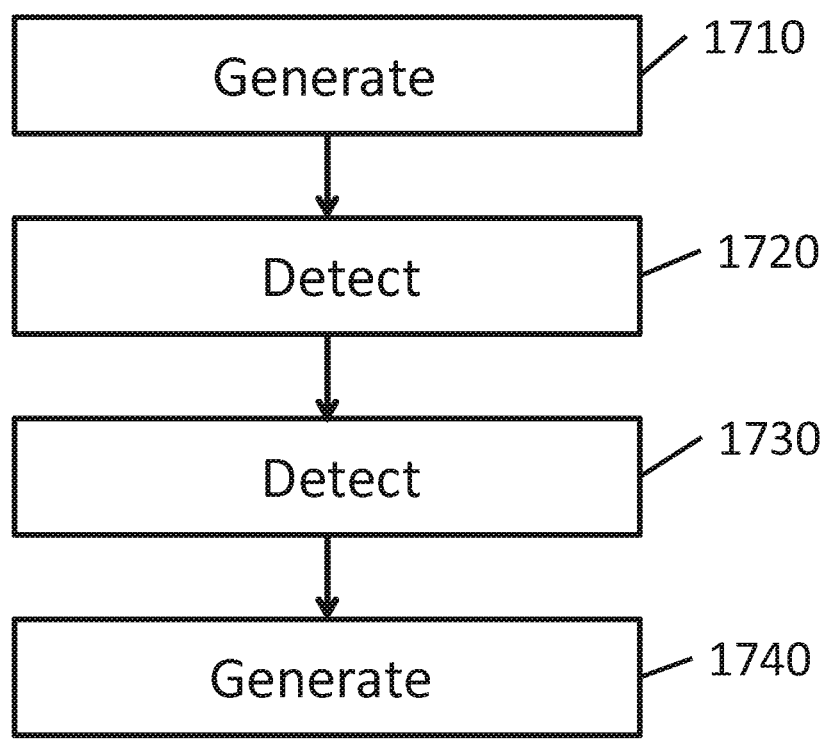
FIG. 17 is a schematic flowchart illustrating a method for controlling images displayed by an HMD.

Referring now to FIG. 17, in embodiments of the disclosure a data processing method for controlling images displayed by an HMD, comprises:

generating (at a step 1710) the images for display to a user wearing the HMD;

detecting (at a step 1720) movement of an eye of the user; and detecting (at a step 1730) saccadic movement of the eye in dependence upon the detected movement of the eye; and generating (at a step 1740) the images for display to the user in response to the detected saccadic eye movement, comprising adjusting one or more image quality parameters for one or more of the images to be displayed by the HMD during the detected saccadic movement.

It will be appreciated that example embodiments can be implemented by computer software operating on a general purpose computing system such as a games machine. In these examples, computer software, which when executed by a computer, causes the computer to carry out any of the methods discussed above is considered as an embodiment of the present disclosure. Similarly, embodiments of the disclosure are provided by a non-transitory, machine-readable storage medium which stores such computer software.

It will also be apparent that numerous modifications and variations of the present disclosure are possible in light of the above teachings. It is therefore to be understood that within the scope of the appended claims, the disclosure may be practised otherwise than as specifically described herein.

As noted previously herein, optionally the control circuitry 1220 and/or processor 1240 may be located at a separate device such as processing unit/console 830 or 910, or such a device may share their functionality with the HMD.

Consequently a head-mountable display (HMD) system may comprise just the head mountable display apparatus, comprising in turn the control circuitry 1220 and processor 1240, or it may comprise the head mountable display apparatus and a processing unit/console 830 or 910, implementing or sharing the role of one or both of the control circuitry 1220 and processor 1240 in any suitable combination.

The foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A head-mountable display (HMD) system comprising:
   at least one detector to detect movement of an eye of a user wearing the HMD;
   control circuitry to detect saccadic movement of the eye in dependence upon the detected movement of the eye;
   a display unit; and
   a processor to generate images for display to the user by the display unit, in which the control circuitry is configured to control the processor in response to the detected saccadic movement, in which the control circuitry is configured to control the processor to adjust one or more image quality parameters for one or more of the images to be displayed by the display unit during the detected saccadic movement, in which the control circuitry is configured to calculate a period of time representing a predicted duration for the detected saccadic movement of the eye in dependence upon the detected movement of the eye, in which the control circuitry is configured to control the processor to adjust one or more of the image quality parameters for one or more of the images to be displayed by the display unit during the detected saccadic movement in dependence upon the calculated period of time, wherein:

the control circuitry is configured to detect a gaze direction of the eye with respect to the display unit in dependence upon the detected movement of the eye, the control circuitry is configured to calculate the period of time representing the predicted duration for the detected saccadic movement of the eye in dependence upon a position of a point of attention in a given image corresponding to a start of the detected saccadic movement and a position of a target object in the given image, and the control circuitry is configured to select the target object in dependence upon a direction associated with the detected saccadic movement and the position of the target object in the given image.

2. The HMD system according to claim 1, in which control circuitry is configured to calculate the period of time in dependence upon a maximum angular velocity associated with the detected movement of the eye.

3. The HMD system according to claim 2, in which control circuitry is configured to calculate the period of time in dependence upon one or more from the list consisting of:
   a magnitude of the maximum angular velocity;
   a time associated with the maximum angular velocity; and
   a gaze direction of the eye corresponding to the maximum angular velocity.

4. The HMD system according to claim 1, in which the control circuitry is configured to calculate the period of time in dependence upon a direction associated with the detected saccadic movement.

5. The HMD system according to claim 1, in which the control circuitry is configured to control the processor to adjust at least one of:
   an image resolution for one or more of the images to be displayed by the display unit;
   a frame rate for at least a subset of the images to be displayed by the display unit;
   a luminance dynamic range for one or more of the images to be displayed by the display unit; and
   a colour dynamic range for one or more of the images to be displayed by the display unit.

6. The HMD system according to claim 1, in which the control circuitry is configured to control the processor to adjust an image resolution for a plurality of images to be displayed by the display unit during the detected saccadic movement in dependence upon the calculated period of time by generating one or more images having a first image resolution and at least one image having a second image resolution, in which the first image resolution is lower than the second image resolution, and in which the at least one image having the second image resolution is to be displayed by the display unit after the one or more images having the first image resolution.

7. The HMD system according to claim 1, in which the control circuitry is configured to control the processor to adjust a frame rate for a plurality of images to be displayed by the display unit during the detected saccadic movement in dependence upon the calculated period of time by generating one or more images each having a first frame duration corresponding to a first frame rate and at least one image having a second frame duration corresponding to a second frame rate, in which the first frame rate is a lower frame rate than the second frame rate, and in which the at least one image having the second frame duration is to be displayed by the display unit after the one or more images having the first frame duration.

8. The HMD system according to claim 7, in which the at least one image having the second frame duration is to be displayed by the display unit during the calculated period of time representing the predicted duration for the detected saccadic movement.

9. The HMD system according to claim 1, in which the processor is configured to generate a first portion of an image within a predetermined distance of a point of attention in the image corresponding to the detected gaze direction with a higher image resolution than a second portion of the image not within the predetermined distance of the point of attention, and in response to the detected saccadic movement the control circuitry is configured to control the processor to adjust an image resolution for a subsequent image to be displayed by the display unit by decreasing the image resolution for the first portion.

10. The HMD system according to claim 1, in which the control circuitry is configured to select the target object from a plurality of target objects in the given image in dependence upon the direction associated with the detected saccadic movement and the positions of the target objects in the given image.

11. The HMD system according to claim 1, in which the selected target object is a predicted target object for the detected saccadic movement, and the control circuitry is configured to control the processor to generate, during the detected saccadic movement, at least one image to be displayed by the display unit during or after the calculated period of time representing the predicted duration for the detected saccadic movement by generating a portion of the at least one image within a predetermined distance of the selected target object with a higher image resolution than a second portion of the at least one image not within the predetermined distance of the selected target object.

12. A data processing method for controlling images displayed by an HMD, comprising:
   generating the images for display to a user wearing the HMD;
   detecting movement of an eye of the user; and
   detecting saccadic movement of the eye in dependence upon the detected movement of the eye;
   calculating a period of time representing a predicted duration for the detected saccadic movement of the eye in dependence upon the detected movement of the eye;
   generating the images for display to the user in response to the detected saccadic eye movement, comprising adjusting one or more image quality parameters for one or more of the images to be displayed by the HMD during the detected saccadic movement in dependence upon the calculated period of time;
   detecting a gaze direction of the eye with respect to a display in dependence upon the detected movement of the eye;

calculating the period of time representing the predicted duration for the detected saccadic movement of the eye in dependence upon a position of a point of attention in a given image corresponding to a start of the detected saccadic movement and a position of a target object in the given image; and selecting the target object in dependence upon a direction associated with the detected saccadic movement and the position of the target object in the given image.

13. A non-transient computer readable storage medium containing computer software which, when executed by a computer, causes the computer to perform a data processing method for controlling images displayed by an HMD, by carrying out actions, comprising:

generating the images for display to a user wearing the HMD;

detecting movement of an eye of the user; and detecting saccadic movement of the eye in dependence upon the detected movement of the eye;

calculating a period of time representing a predicted duration for the detected saccadic movement of the eye in dependence upon the detected movement of the eye;

generating the images for display to the user in response to the detected saccadic eye movement, comprising adjusting one or more image quality parameters for one or more of the images to be displayed by the HMD during the detected saccadic movement in dependence upon the calculated period of time;

detecting a gaze direction of the eye with respect to a display in dependence upon the detected movement of the eye;

calculating the period of time representing the predicted duration for the detected saccadic movement of the eye in dependence upon a position of a point of attention in a given image corresponding to a start of the detected saccadic movement and a position of a target object in the given image; and selecting the target object in dependence upon a direction associated with the detected saccadic movement and the position of the target object in the given image.

* * * * *